United States Patent
Hamakawa et al.

(10) Patent No.: US 9,793,569 B2
(45) Date of Patent: Oct. 17, 2017

(54) ELECTRIC STORAGE ELEMENT

(71) Applicant: Lithium Energy Japan, Kyoto-shi (JP)

(72) Inventors: Keita Hamakawa, Ritto (JP);
Noriyoshi Munenaga, Ritto (JP);
Satoru Kawakami, Ritto (JP); Tomoko Nishikawa, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 449 days.

(21) Appl. No.: 14/036,016

(22) Filed: Sep. 25, 2013

(65) Prior Publication Data
US 2014/0087223 A1   Mar. 27, 2014

(30) Foreign Application Priority Data

Sep. 26, 2012 (JP) ................................ 2012-212793
Mar. 15, 2013 (JP) ................................ 2013-054185
Aug. 28, 2013 (JP) ................................ 2013-177003

(51) Int. Cl.
*H01M 10/02* (2006.01)
*H01M 10/04* (2006.01)

(52) U.S. Cl.
CPC ......... *H01M 10/02* (2013.01); *H01M 10/049* (2013.01); *H01M 10/0413* (2013.01)

(58) Field of Classification Search
CPC ............ H01M 10/02; H01M 10/0413; H01M 10/049; H01M 2/0217; H01M 2/0237; H01M 2/024
See application file for complete search history.

(56) References Cited

U.S. PATENT DOCUMENTS 7,790,313 B2    9/2010  Lee
2003/0129479 A1*  7/2003  Munenaga ............ H01M 2/145
                                                              429/94
(Continued)

FOREIGN PATENT DOCUMENTS

JP    2002-231297 A    8/2002
JP    2006-40901 A     2/2006
(Continued)

OTHER PUBLICATIONS

Japanese Office Action dated Jul. 18, 2017 in corresponding Japanese Patent Application No. 2013-177003, with an English translation thereof.

*Primary Examiner* — Milton I Cano
*Assistant Examiner* — Ling R Zeng
(74) *Attorney, Agent, or Firm* — McGinn IP Law Group, PLLC

(57) ABSTRACT

A battery includes positive and negative external terminals having exposed portions exposed from a casing to the outside, positive and negative current collectors connected to the external terminals, and electrode assemblies having positive and negative electrodes and a separator. The positive and negative electrodes are wound with the separator being interposed so as to have positions shifted to opposite sides in a width direction to the separator. Formed in the casing is a narrowly elongated gap extending between the positive current collector side and the negative current collector side. The positive electrode side of the gap is closed by a closure member. A foreign material is prevented from moving without decreasing an electric capacity of the battery and deteriorating injection property of an electrolytic solution.

20 Claims, 16 Drawing Sheets

(56) References Cited

U.S. PATENT DOCUMENTS

| | | |
|---|---|---|
| 2006/0024578 A1 | 2/2006 | Lee |
| 2010/0287763 A1 | 11/2010 | Tsuchiya et al. |
| 2011/0104540 A1 | 5/2011 | Lee et al. |
| 2011/0117402 A1* | 5/2011 | Kim .................... H01M 2/0237 429/94 |
| 2011/0206977 A1* | 8/2011 | Ikeda ................. H01M 2/0257 429/156 |
| 2012/0189889 A1 | 7/2012 | Kim |
| 2013/0209859 A1* | 8/2013 | Tsuruta .................... H01G 9/06 429/142 |

FOREIGN PATENT DOCUMENTS

| | | |
|---|---|---|
| JP | 2006-236790 A | 9/2006 |
| JP | 2009-176482 A | 8/2009 |
| JP | 2011-096660 A | 5/2011 |
| JP | 2012-43564 A | 3/2012 |
| JP | 2012-156134 A | 8/2012 |

* cited by examiner

FIG. 7 (a)
FIG. 7 (b)
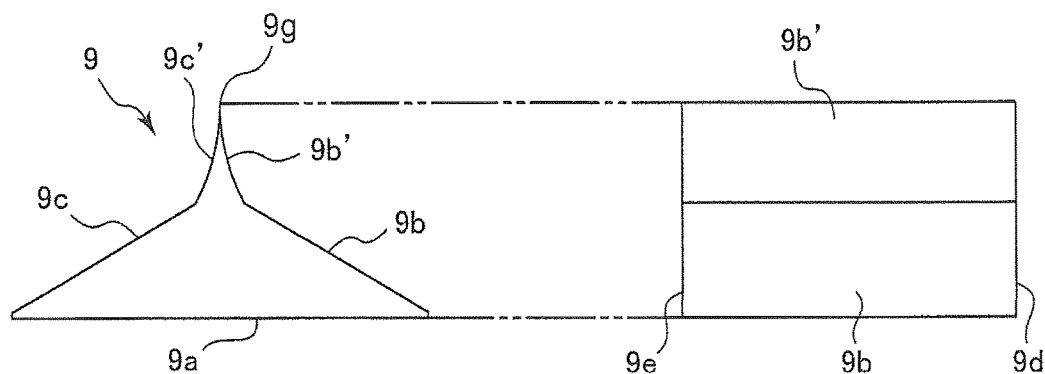
Fig.8
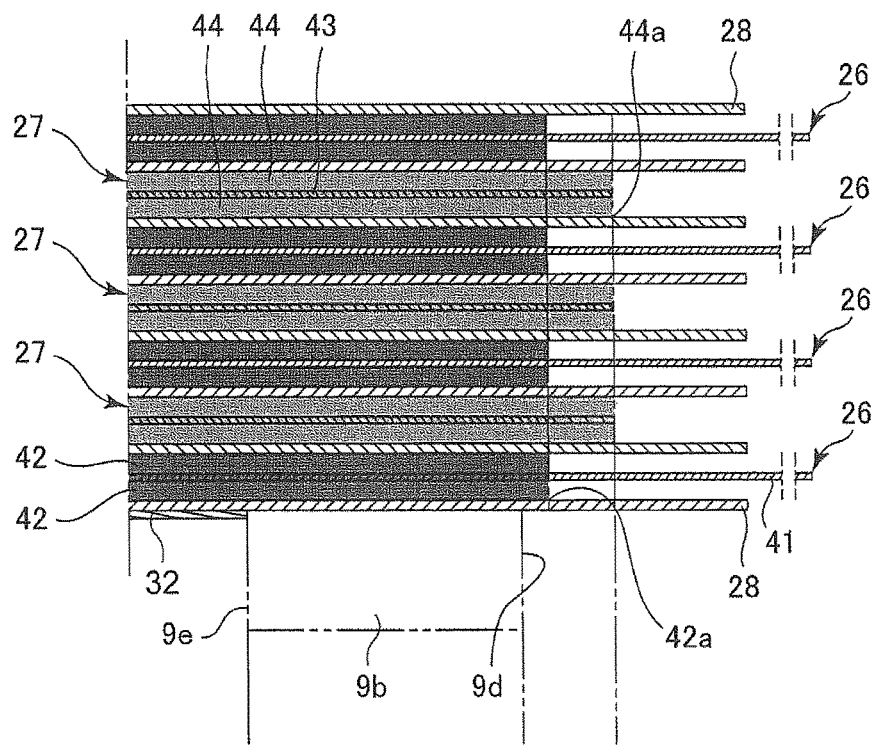

ELECTRIC STORAGE ELEMENT

CROSS-REFERENCE TO RELATED APPLICATIONS

This application claims priorities of Japanese Patent Applications No. 2012-212793 filed on Sep. 26, 2012, No. 2013-054185 filed on Mar. 15, 2013, and No. 2013-177003 filed on Aug. 28, 2013 the contents of which are incorporated herein by reference.

FIELD

The present invention relates to an electric storage element.

BACKGROUND

An electric storage element disclosed in JP 2012-43564 A includes insulation covers that respectively cover collector tabs located on both sides of an electrode assembly. The electric storage element disclosed in JP 2002-231297 A includes a foamed-resin sheet inserted in a gap between the electrode assembly and a casing.

However, because made of a resin, the insulation cover disclosed in JP No. 2012-43564 A needs to have a certain thickness. For this reason, the insulation cover restricts the size of the electrode assembly and thereby decreases an electric capacity. Further, since the insulation cover covers the entire area of the collector tab, injection property (easiness in injecting) when an electrolytic solution is injected into the interior of the casing is decreased. A foamed-resin sheet in JP 2002-231297 A is arranged entirely on the lower area of the electrode assembly. Therefore, a gap is not formed between the lower portion of the electrode assembly and the bottom surface of the casing. This decreases the injection property.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to effectively prevent a foreign material in a battery case from moving without decreasing an electric capacity of an electric storage element and deteriorating the injection property of an electrolytic solution.

The present invention provides an electric storage element comprising a casing, a positive external terminal and a negative external terminal respectively comprising exposed portions exposed from the casing to the outside, a positive current collector and a negative current collector arranged inside the casing and respectively connected to the positive external terminal and the negative external terminal, a plurality of electrode assemblies arranged inside the casing so as to be arranged adjacent to each other, each of the electrode assemblies having a positive electrode, a negative electrode, and a separator each of which has a strip-like shape, the positive and negative electrodes being wound with the separator being interposed therebetween so as to have positions shifted to opposite sides in a width direction with reference to the separator, and the positive and negative electrodes being respectively connected to the positive and negative current collectors, a gap defined between the two electrode assemblies arranged adjacent to each other and a bottom of the casing so as to extend between the positive current collector side and the negative current collector side and to allow fluid communication between the positive current collector side and the negative current collector side, and a closure member that closes at least a part of the gap.

BRIEF DESCRIPTION OF DRAWINGS

The foregoing and the other features of the present invention will become apparent from the following description and drawings of an illustrative embodiment of the invention in which:

FIG. 7 shows closure piece wherein (a) is a front view and (b) is a side view;

FIG. 8 is a schematic diagram showing a positional relationship between closure pieces, positive electrodes, and negative electrodes;

DESCRIPTION OF EMBODIMENTS

Figure 1:
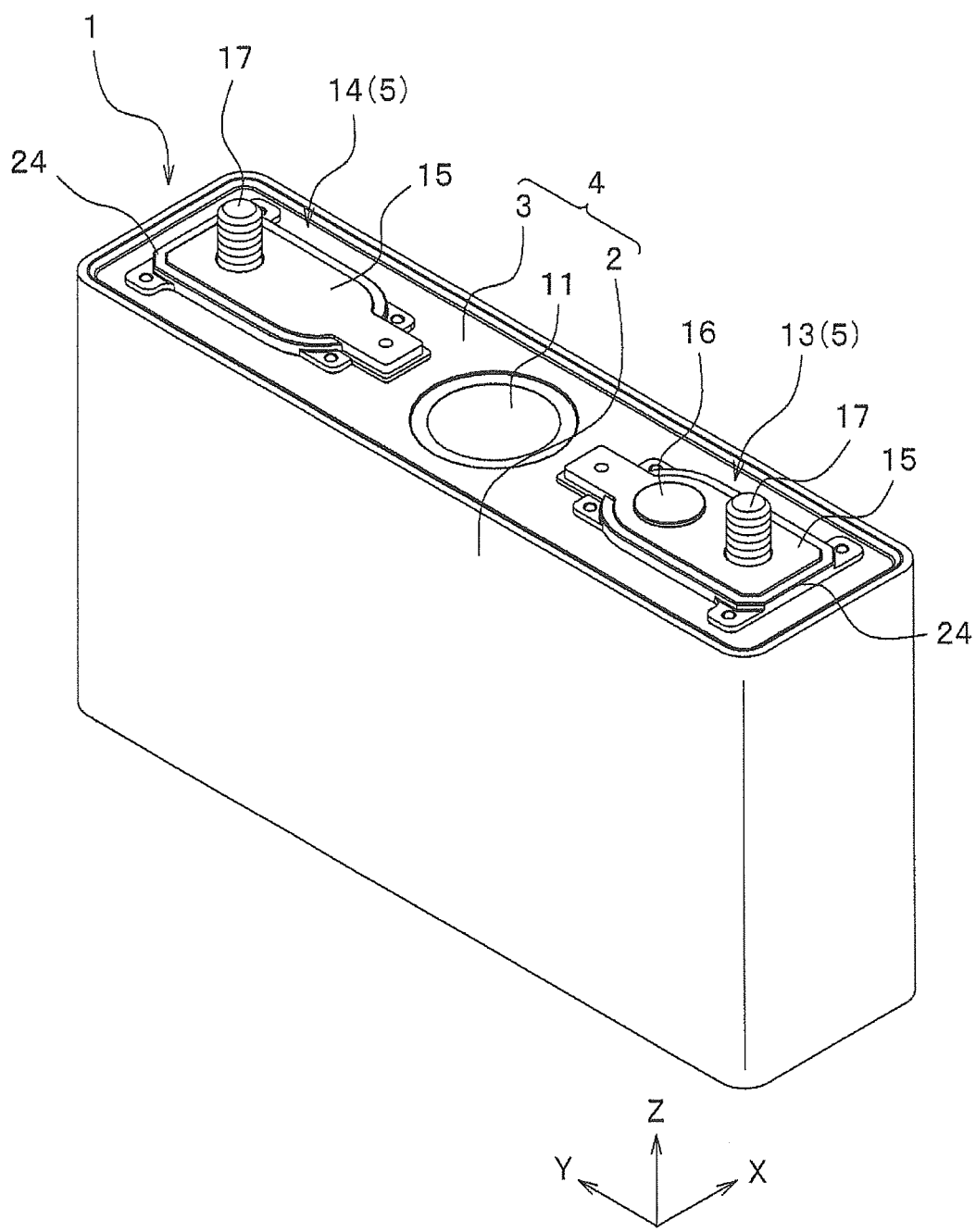
FIG. 1 is a perspective view showing a non-aqueous electrolyte secondary battery according to a first embodiment of the present invention.

The present invention provides an electric storage element comprising a casing, a positive external terminal and a negative external terminal respectively comprising exposed portions exposed from the casing to the outside, a positive current collector and a negative current collector arranged inside the casing and respectively connected to the positive external terminal and the negative external terminal, a plurality of electrode assemblies arranged inside the casing so as to be arranged adjacent to each other, each of the electrode assemblies having a positive electrode, a negative electrode, and a separator each of which has a strip-like shape, the positive and negative electrodes being wound with the separator being interposed therebetween so as to have positions shifted to opposite sides in a width direction with reference to the separator, and the positive and negative electrodes being respectively connected to the positive and negative current collectors, a gap defined between the two electrode assemblies arranged adjacent to each other and a bottom of the casing so as to extend between the positive current collector side and the negative current collector side and to allow fluid communication between the positive current collector side and the negative current collector side, and a closure member that closes at least a part of the gap.

Specifically, the closure member is arranged on the positive current collector side in the gap. The closure member, the two electrode assemblies arranged adjacent to each other, and the bottom of the casing define a cylindrical space having an opening on the negative current collector side and closed with the closure member on the positive current collector side.

The gap in the casing on the positive electrode side is closed with the closure member. This effectively prevents a foreign material in the casing from moving without deteriorating the injection property of an electrolytic solution. Since the closure member is arranged in the gap formed between the electrode assembly and the bottom of the casing, employing the closure member does not require reduction in size of the electrode assembly, resulting in that an electric capacity does not decrease.

According to the present invention, since the closure member is arranged so as to close the gap formed between a curved surface of the electrode body and the bottom surface of the casing, particles are prevented from flowing through a region that has the most sectional area and in which the particles easily flow from the negative electrode side, and the particles can be reliably prevented from flowing into the electrode bodies.

Hereinafter, an embodiment of the present invention will be described with reference to the accompanying drawings. In the following description, terms indicating specific directions and positions (including "above", "below", "side", "end", and the like) are used is necessary. These terms are used just for the purpose of easier understanding of the invention with reference to the drawings, and the meanings of the terms should not restrict the technical scope of the present invention. Further, the following description essentially mere examples, and should not be intended to restrict the present invention, application, or usage thereof.

(First Embodiment)

Figure 2:
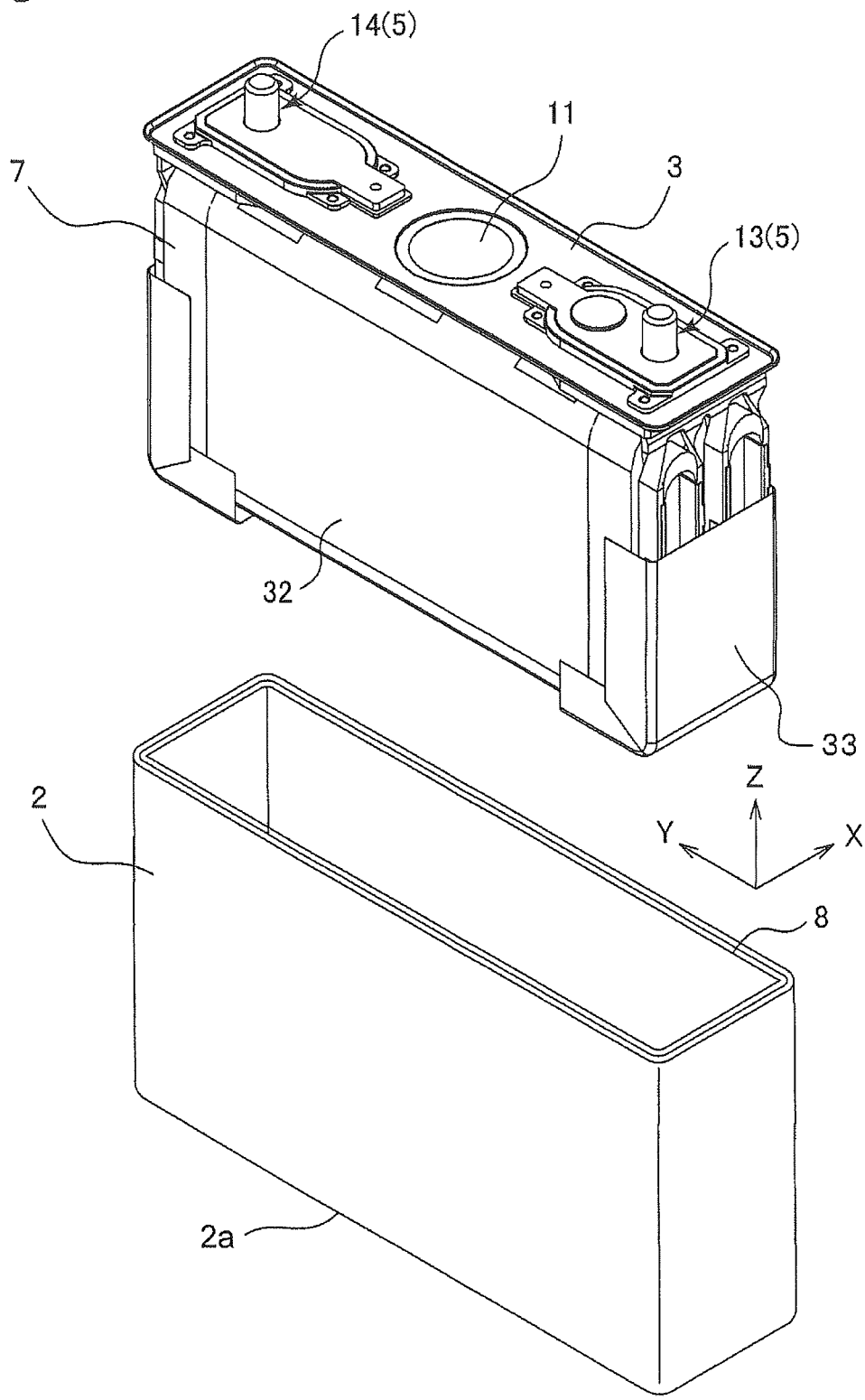
FIG. 2 is an exploded perspective view showing a state in which a battery case is removed in the state shown in FIG. 1.

FIGS. 1 and 2 show a non-aqueous electrolyte secondary battery (to be simply referred to as a battery 1 hereinafter) according to a first embodiment of the present invention. The battery 1 includes a casing 4 configured by a battery case 2 and a lid 3, an external terminal 5 having an exposed surface exposed from the lid 3, an current collector 6 arranged inside the casing 4 and electrically connected to the external terminal 5, and an electrode assemblies 7 arranged inside the casing 4 and electrically connected to the current collector 6.

The battery case 2 has a substantially rectangular parallelepiped shape having an open upper surface, and is made of aluminum, an aluminum alloy, or the like.

Figure 3:
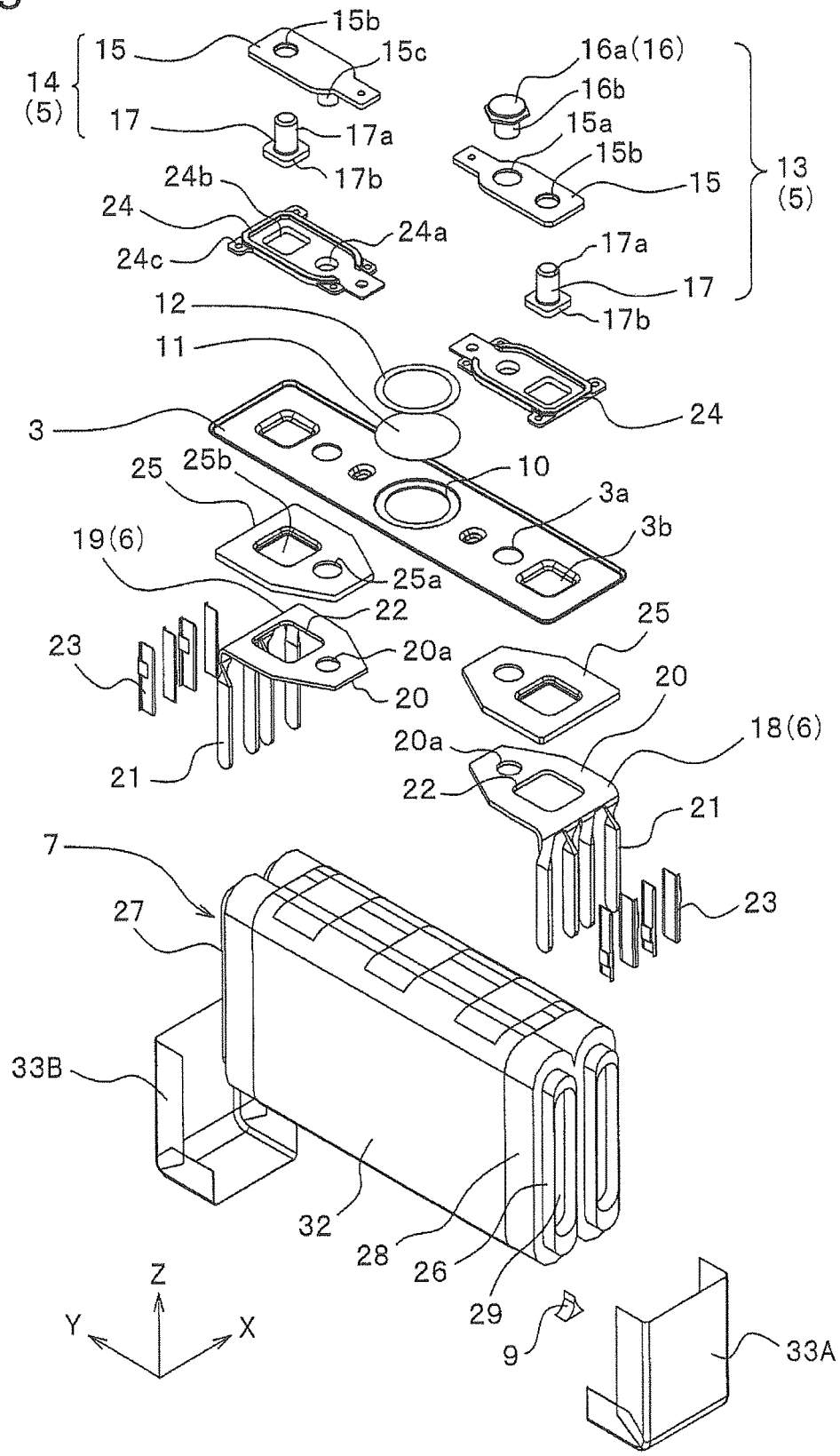
FIG. 3 is an exploded perspective view of the non-aqueous electrolyte secondary battery shown in FIG. 1.

As shown in FIG. 3, the lid 3 is a long metal plate having a long rectangular shape in a planar view. At the central portion of the lid 3, a substantially elliptical opening 10 with a step from an upper surface side. A metal safety valve 11 is attached to the opening 10 by a press ring 12. In the safety valve 11, a thin portion having a substantially H-shape is formed. The thin portion splits when an inner pressure abnormally increases so as to reduce the inner pressure.

In the lid 3, from the opening 10 to the both end sides, a through hole 3a and an recess 3b are formed in this order. An auxiliary terminal 16 described later penetrates the through hole 3a to connect a connection terminal 15 and the current collector 6. In the recess 3b, a portion (protrusion) projecting downward and formed by a recess 24b of a first gasket 24 described later is arranged. In a part of the lid 3, although not shown, an injection hole with a small diameter to inject an electrolytic solution into the casing 4 is formed. The injection hole is closed with a plug after the solution is injected.

The external terminal 5 includes a positive external terminal 13 and a negative external terminal 14. The positive external terminal 13 includes the connection terminal 15, the auxiliary terminal 16, and a connection bolt 17. The negative external terminal 14 includes the connection terminal 15 and the connection bolt 17. All the parts described above are made of a conductive material such as aluminum, an aluminum alloy or the like. The connection terminal 15 on the positive electrode side is a plate-like part. Formed in the plate-like portion is a through hole 15a that a shaft portion of the auxiliary terminal 16 penetrates and a screw hole 15b with which a bolt portion 17a of the connection bolt 17 is thready engaged. Similarly to the positive electrode side, the connection terminal 15 on the negative electrode side is a plate like portion in which a screw hole 15b is formed. However, the connection terminal 15 on the negative electrode side is different from the connection terminal 15 on the positive side in that a protrusion 15c (corresponding to a shaft portion 16b described later) is formed from the lower surface. The auxiliary terminal 16 is to electrically connect the connection terminal 15 and the current collector 6 described later. The connection bolt 17 includes the bolt portion 17a and a flange portion 17b formed on a lower end thereof.

The current collector 6 includes a positive current collector 18 made of an aluminum, an aluminum alloy, or the like and a negative current collector 19 made of a copper, a copper alloy, or the like. In each of the collectors 6, a long metal plate material is pressed to form a connection receiver 20 and legs 21 extending from both ends of the connection receiver 20. In each of the connection receivers 20, a through hole 20a and an opening 22 are formed. The shaft portion 16b of the auxiliary terminal 16 is joined to the through hole 20a of the connection receiver 20 of the positive current collector 18 from the upper surface side. The protrusion 15c of the connection terminal 15 is joined to the through hole 20a of the connection receiver 20 of the negative current collector 19 from the upper surface side. A rectangular opening 22 is formed in each of the connection receiver 20.

The legs 21 extends in orthogonal directions while being twisted at 90 degrees from one edge of the connection receiver 20 and are arranged along the both end surfaces of electrode assembly 7. The legs 21 are connected to a positive electrode 26 and a negative electrode 27 of the electrode assembly 7 through clips 23.

The first gasket 24 is arranged between the external terminal 5 and the lid 3, and a second gasket 25 is arranged between the lid 3 and the current collector 6. The gaskets 24 and 25 are respectively formed with through holes 24a and 25a and recesses 24b and 25b. Through holes 24c are respectively formed at four places of an outer edge of the gasket 24 and stainless balls (not shown) are respectively arranged in the through holes 24c.

The electrode assembly 7 includes the positive electrode 26, the negative electrode 27, and a separator 28 made of a porous resin film and arranged between the positive electrode 26 and the negative electrode 27. All of the positive electrode 26, the negative electrode 27, and the separator 28 have strip-like shape. The positive electrode 26, the negative electrode 27, and the separator 28 are wound around a winding core 29 and flattened in a state in which the positive electrode 26 and the negative electrode 27 have positions shifted to opposite sides in a width direction with reference to the separator 28. As the winding core 29, for example, a polyethylene sheet is used. Also referring to FIG. 8, in the present embodiment, the positive electrode 26 includes a positive metal foil 41 made of an aluminum-based material and positive-electrode active material layers 42 formed on the both surfaces of the positive metal foil 41. The negative electrode 27 includes a negative metal foil 43 made of a copper-based material and negative-electrode active material layers 44 formed on the both surfaces of the negative metal foil 43.

As shown in FIG. 3, as the electrode assemblies 7 flattened in a direction of thickness (X), pairs of electrode assemblies 7 are arranged in the direction of thickness (X), each pair of electrode assemblies 7 being wrapped with a bundling sheet 32 and integrated with each other. In other words, the adjacent electrode assemblies 7 are bundled together with each other by the bundling sheet 32. In this state, the separators 28 protrude from the both ends of the electrode assembly 7, and the positive electrode 26 and the negative electrode 27 protrude from the separators 28. To the two portions where the positive electrode 26 and the negative electrode 27 protrude, the both legs 21 of the positive current collector 18 and the negative current collector 19 are connected through clips 23, respectively. In the present embodiment, the positive electrode 26 and the positive current collector 18 are connected to the clips 23 by ultrasonic welding, and the negative electrode 27 and the negative current collector 19 are also connected to the clips 23 by ultrasonic welding.

Figure 4:
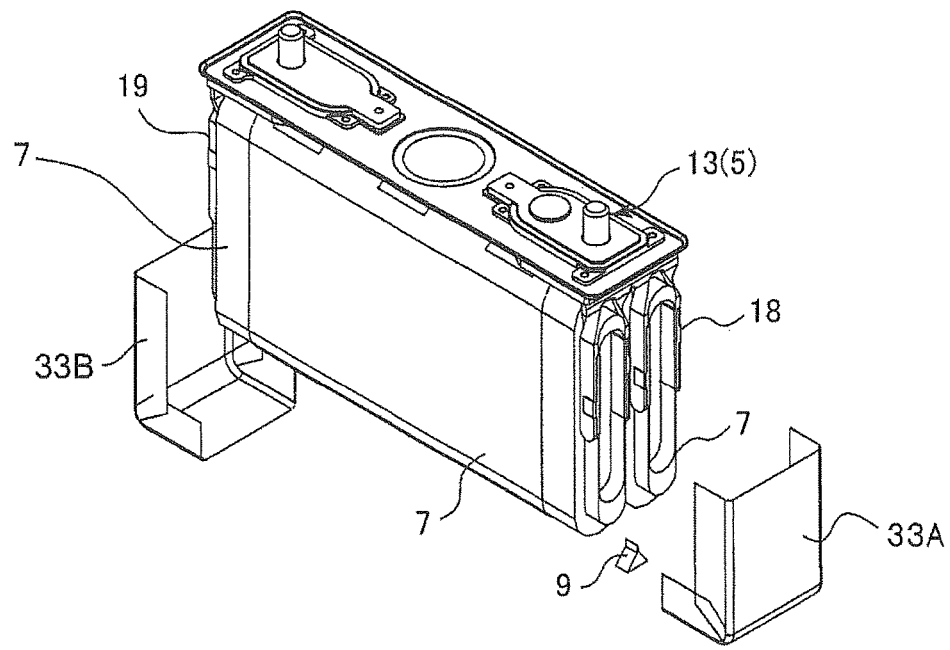
FIG. 4 is an exploded perspective view of the non-aqueous electrolyte secondary battery shown in FIG. 1.
Figure 4:
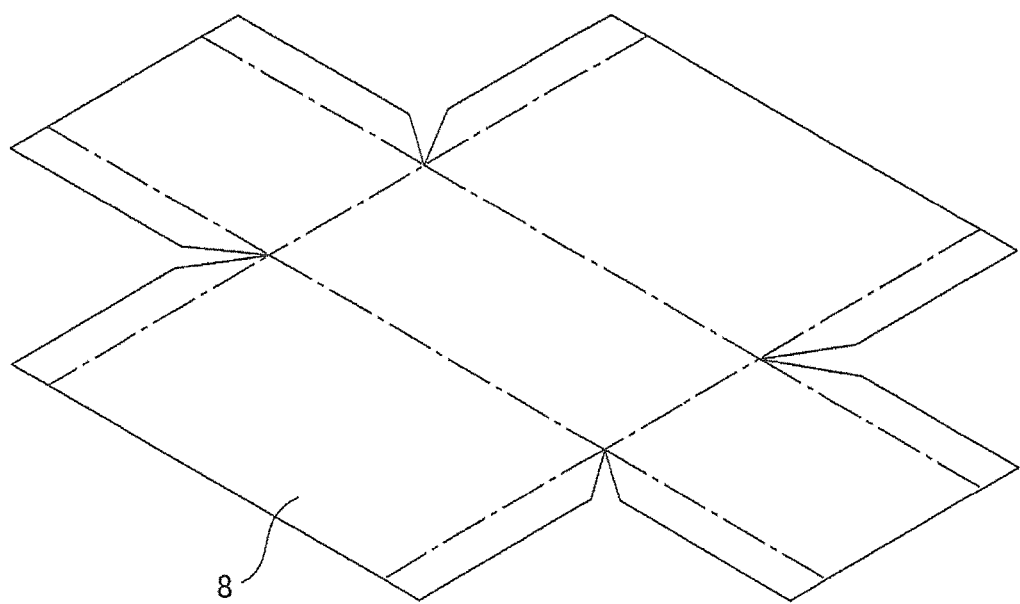

As shown in FIG. 4, both of the lower end portions of the electrode assembly 7 are covered with protection sheets 33A and 33B together with collectors 18 and 19. The protection sheet 33 is made of an insulating material. The protection sheets 33A and 33B preferably have film-like shapes and are made of a material with excellent heat resistance property. By using the material with excellent in heat resistance property, a defect such as deformation caused by heat from the electrode assembly 7 does not occur. By using the film-like shape, an occupied space is suppressed, thereby preventing the electrode assembly 7 from reducing in size. In this embodiment, as the protection sheets 33A and 33B, acrylic tapes each having one surface applied with an adhesive agent are used. The protection sheets 33A and 33B need only be excellent in heat resistance, and need not be applied with an adhesive agent or an adhesive compound. In this case, the protection sheets 33A and 33B may be stuck with an additional adhesive tape or the like.

The electrode assemblies 7 are accommodated in the battery case 2 in two lines in a width direction (X direction), i.e., in a short side direction of the battery case 2 such that the collectors 6 connected through the clips 23 are arranged at the both ends of the battery case 2 in a longitudinal direction (Y direction) thereof.

As is apparent from FIG. 2 and FIG. 4, the electrode assemblies 7, portions (including the clips 23) of the positive and negative current collectors 18 and 19, the portions being connected to the electrode assemblies 7, and the entire areas of the protection sheets 33A and 33B are covered with an insulation sheet 8. The insulation sheet 8 is arranged on all inner surfaces (all inner surfaces of a bottom wall and side walls) of the battery case 2.

Figure 5:
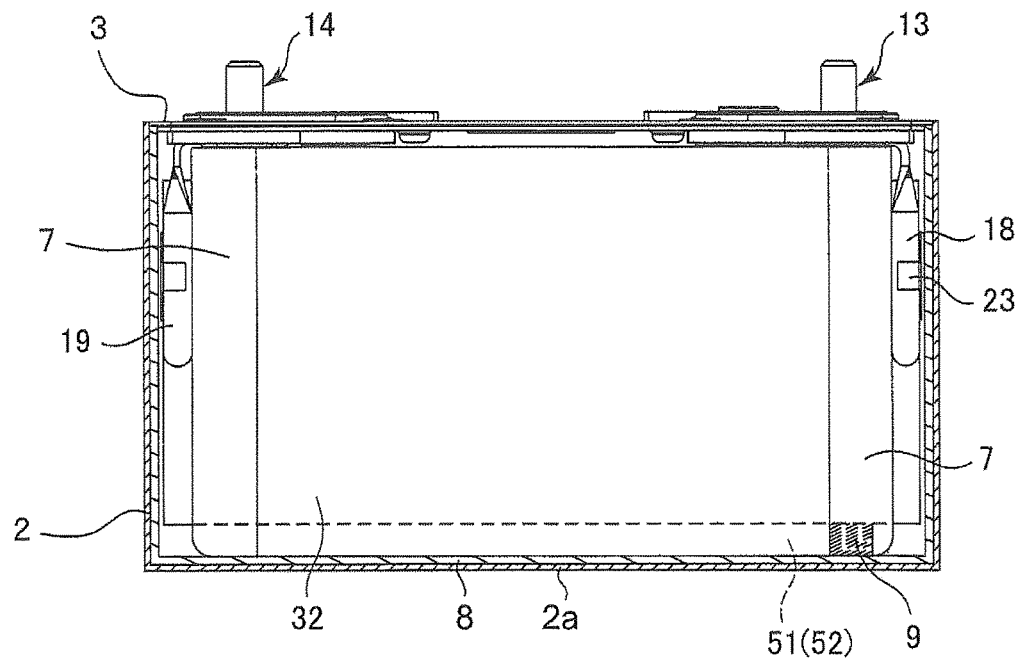
FIG. 5 is a sectional view of the non-aqueous electrolyte secondary battery shown in FIG. 1.
Figure 6:
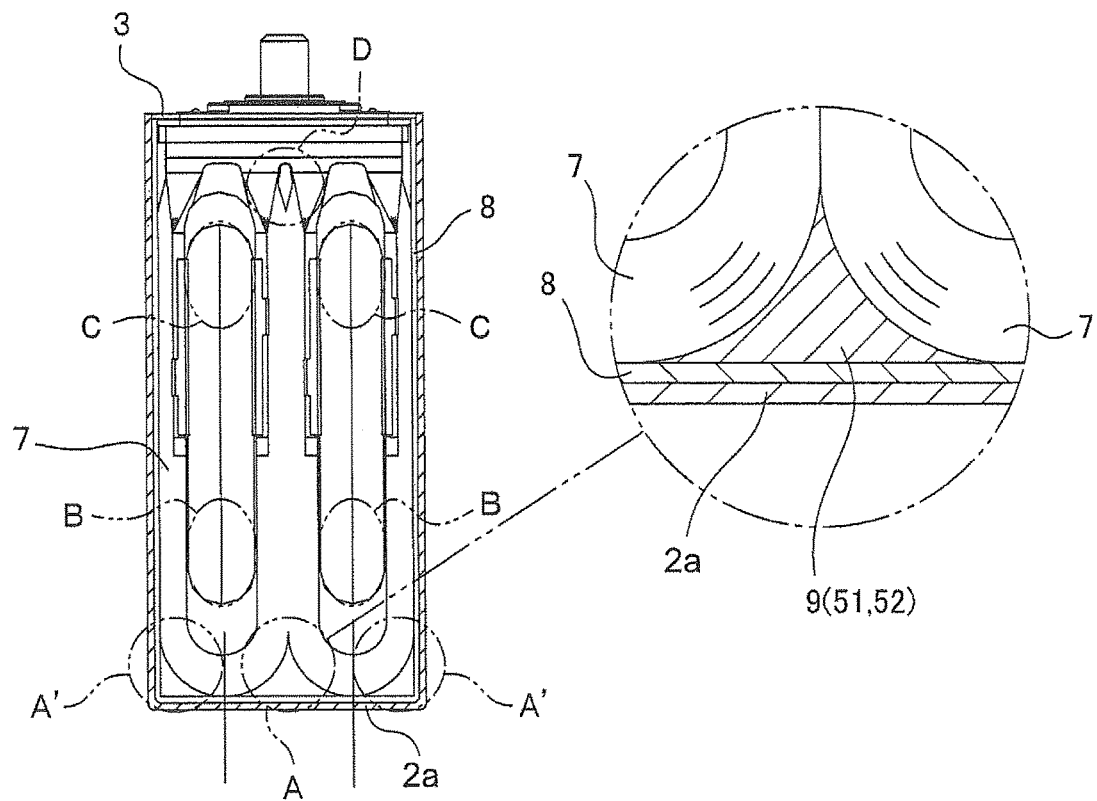
FIG. 6 is a sectional view of the non-aqueous electrolyte secondary battery shown in FIG. 1.

In the two electrode assemblies 7 arranged adjacent to each other and wrapped with the bundling sheet 32, as most apparently shown in FIG. 6, outside surfaces of a portion facing the lid 3 (upper end side in FIG. 6) and a portion facing a bottom 2a of the battery case 2 through the insulation sheet 8 (lower end side in FIG. 6) are convexly curved surfaces. Specifically, the outside surfaces of these portions substantially have circular-arc shapes or low-profile elliptic-arc shapes when shown in a side view. Also referring to FIG. 5, the portions of the two electrode assemblies 7 facing the bottom 2a of the battery case 2 through the insulation sheet 8 and the bottom 2a of the battery case 2 define a narrowly elongated gap 51 extending between the positive current collector 18 side (right wall side in the battery case 2 in FIG. 5) and the negative current collector 19 side (left wall side in the battery case 2 in FIG. 5) in the battery case 2. The gap 51 allows fluid communication of left and right ends (positive current collector 18 side and negative current collector 19 side) near the bottom 2a in the battery case 2.

A closure piece (closure member) 9 is arranged on the positive current collector 18 side (right side of the center of the gap 51 in FIG. 5) of the gap 51 to partially close the gap 51. Since closed by the gap 51 by the closure piece 9, the gap 51 does not have openings at the both ends and forms a cylindrical space 52 having an opening at one end (negative current collector 19 side) and being closed at the other end (positive current collector 18 side). Specifically, the cylindrical space 52 is defined by the portions of the two electrode assemblies 7 arranged adjacent to each other, i.e. the portions facing the bottom 2a of the battery case 2 through the insulation sheet 8, the bottom 2a of the battery case 2, and the closure piece 9.

The closure piece 9 is preferably made of a material such as foamed polyethylene having elasticity. Also referring to FIG. 7, the closure piece 9 includes a bottom 9a, a pair of side wall portions 9b and 9c, and a pair of end portions 9d and 9e (planar surfaces in this embodiment) serving as both ends of the bottom 9a and the side wall portions 9b and 9c in the extending direction of the gap 51 (cylindrical space 52). The bottom 9a is brought into tight contact with the bottom of the battery case 2 through the insulation sheet 8, and the side wall portions 9b and 9c are brought into tight contact with the outside surfaces of the electrode assembly 7 facing the bottom of the battery case 2 so as to achieve closing the gap 51 with the closure piece 9. In this embodiment, a bottom surface of the bottom 9a is a planar surface, and is arranged on the bottom 2a of the battery case 2 through the insulation sheet 8. The side wall portions 9b and 9c have proximal sides connected to the bottom 9a. The side wall portions 9b and 9c come close to each other toward the front edge to form an acute point end portion 9g. Each of the side wall portions 9b and 9c forms a flat surface on the proximal (bottom 9a) side, and portions 9b' and 9c' on the point end portion 9g side form curved surfaces that are concavely curved. The shapes of the side wall portions 9b and 9c of the closure piece 9 are formed such that the outside surfaces of the electrode assemblies 7 facing the bottom 2a of the battery case 2 are fitted on the convexly curved surface. In particular, the portions 9b' and 9c' on the point end portion 9g sides of the side wall portions 9b and 9c have small volumes of foam and rigidities that are considerably lower than those of other portions of the closure piece 9. For this reason, the portions 9b' and 9c' are not easily deformed along the shapes of the bottoms of the electrode assemblies 7. In the present embodiment, when the portions 9b' and 9c' of the side wall portions 9b and 9c on the point end 9g side have curved shapes fitted on the bottoms of the electrode assemblies 7 in advance before the portions 9b' and 9c' are arranged on the bottoms of the electrode assemblies 7, once the closure piece 9 is arranged on the bottoms of the electrode assemblies 7, the portions 9b' and 9c' on the point end portion 9g side are reliably fitted on the bottoms of the electrode assemblies 7. On the other hand, since portions except for the portions 9b' and 9c' on the point end 9g side of the side wall portions 9b and 9c (portions of the side wall portions 9b and 9c of the closure piece 9 on the bottom 9a side) have sufficient volumes of foam. Therefore, when the portions are arranged on the bottoms of the electrode assemblies 7, the portions are elastically deformed to be fitted on the bottoms of the electrode assemblies 7. As described above, since the shapes of the side wall portions 9b and 9c are set to improve the adhesion of the closure piece 9 to the portions of the electrode assemblies 7 facing the bottom 2a of the battery case 2. Not only the portions 9b' and 9c' on the point end portion 9g side, but also the entire side wall portions 9b and 9c may be concavely curved.

As will be described later, when the closure piece 9 is pressed between the electrode assemblies 7 arranged adjacent to each other so as to be arranged on the positive current collector 18 side of the gap 51. At the positions, the side wall portions 9b and 9c are in tight contact with the outside surfaces of the electrode assemblies 7 facing the bottom 2a of the battery case 2. On the other hand, referring to FIG. 8, at ends of the electrode assemblies 7 on the positive current collector 18 side, an end 42a of the positive-electrode active material layer 42 and an end 44a of the negative-electrode active material layers 44 are present. In the present embodiment, the position of the end 9d of the closure piece 9 on the positive current collector 18 side is set so prevent a force acting from the closure piece 9 to the electrode assemblies 7 that causes loads on the ends 42a and 44a of the positive and negative electrode active material layers 42 and 44. The loads on the ends 42a and 44a can cause that tearing of the separator 28 and a short-circuit due to the tearing.

Referring to FIG. 8, the end 44a of the negative-electrode active material layers 44 is located on the positive current collector 18 side (on the right in FIG. 8) with reference to the end of the positive-electrode active material layer 42. The end 9d of the closure piece 9 is located on the negative current collector 19 side (left side in FIG. 8) with reference to the end 44a of the negative-electrode active material layers 44 on the positive current collector 18 side. The positional setting can prevent a force acting when the closure piece 9 is pressed between the electrode assemblies 7 places a load on the end 44a of the negative-electrode active material layers 44. This prevents the tearing of the separator 28 and the short-circuit due to the tearing. The end 9d of the closure piece 9 is located on the negative current collector 19 side with reference to the end 42a of the positive-electrode active material layer 42 on the positive current collector 18 side. This positional setting can prevent a force acting when the closure piece 9 is pressed between the electrode assemblies 7 places a load on the end 42a of the positive-electrode active material layers 42. This prevents the tearing of the separator 28 and the short-circuit due to the tearing. The closure piece 9 is arranged so as not to interfere with the bundling sheet 32. Specifically, an end 9e of the closure piece 9 on the negative current collector 19 side is set on the positive current collector 18 side (right side in FIG. 8) with reference to the bundling sheet 32.

A method of manufacturing the battery 1 having the above configuration will be described below.

The strip-shaped positive electrode 26, the strip-shaped negative electrode 27, and the strip-shaped separator 28 are carried and wound up on the winding core 29 attached to a rotor (not shown) to have a flat shape. At this time, the positive electrode 26 and the negative electrode 27 are shifted with reference to the separator 28 on opposite sides in a width direction. This causes that the positive electrode 26 protrudes on a one-end side and the negative electrode 27 protrudes on the other-end side.

Cylindrical bodies that are flattened to have flat shapes are arranged in a direction (X) of thickness, and the outer circumferences thereof are wrapped with the bundling sheet 32 so as to be integrated with each other.

The first gaskets 24 are respectively arranged on upper surface of the lid 3 on the both end sides. On the upper surface of each of the first gaskets 24, the flange portion 17b of the connection bolt 17 is arranged in the recess 24b, and the connection terminal 15 is arranged thereabove. The bolt portion 17a of the connection bolt 17 penetrates the through hole 15b of the connection terminal 15 to protrude upward. On the other hand, the collectors 6 are respectively arranged on lower surfaces of the lid 3 on the both end sides through the second gasket 25. The connection terminal 15 and the collector 6 are connected to each other with the auxiliary terminal 16 so as to hold the first gasket 24, the lid 3, and the second gasket 25 therebetween.

The lid 3 on which the collectors 6 and the like are integrated with each other and the electrode assemblies 7 are connected to each other such that the legs 21 of the collectors 6 and the negative electrodes 27 or the positive electrodes 26 of the electrode assemblies 7 are welded by ultrasonic welding through the clips 23.

The closure piece 9 is fixed by pressing with the bundling sheet 32 to a position indicated in FIG. 8 between the two electrode assemblies 7 arranged adjacent to each other. More specifically, the side wall portions 9b and 9c on the front-edge side are inserted into a space between the two electrode assemblies 7 such that the side wall portions 9b and 9c are respectively pressed against the outer circumference surfaces of the electrode assemblies 7. When the closure piece 9 is made of a material such as foamed polyethylene having elasticity, the side wall portions 9b and 9c of the closure piece 9 are reliably brought into press contact with the outside surfaces of the electrode assemblies 7 by elastic deformation of the closure piece 9.

Then, the insulation sheet 8 is arranged in the battery case 2 followed by insertion of the electrode assemblies 7 into the battery case 2. The bottom 9a of the closure piece 9 is brought into tight contact with the bottom 2a of the battery case 2 by pressing through the insulation sheet 8. When the closure piece 9 is compressed in a height direction thereof, the side wall portions 9b and 9c of the closure piece 9 are brought into tight contact with the outer circumference surfaces of the electrode assemblies 7 by further being pressed. As a result, upon completion of the storage of the electrode assemblies 7 in the battery case 2, the closure piece 9 on the positive current collector 18 side closes the narrowly elongated gap 51 formed by the portions of the two electrode assemblies 7 facing the bottom 2a of the battery case 2 through the insulation sheet 8 and the bottom 2a of the battery case 2. In other words, upon completion of the storage of the electrode assemblies 7 in the battery case 2, formed on the bottom 2a side in the battery case 2 is the cylindrical space 52 that has an opening on the negative current collector 19 side and is closed on the positive current collector 18 side.

Subsequently, an upper opening of the battery case 2 is closed with the lid 3 and sealed by welding or the like followed by injection of an electrolytic solution into the battery case 2 from the injection hole formed in the lid 3. After the electrolytic solution is injected, the injection hole is sealed to complete manufacturing of the battery 1. The closure piece 9 is arranged only on the positive current collector 18 side of the gap 51. Thus, unlike in the case that the closure pieces 9 are arranged on the both of positive and negative electrode sides or cover the entire lower surfaces of the electrode assemblies 7 (from the negative electrode side to the positive electrode side), the closure piece 9 does not considerably deteriorate the smoothness of flow of the electrolytic solution during the injection. Thus, the arranged closure piece 9 does not deteriorate the injection property of the electrolytic solution.

In manufacturing of the battery 1, the legs 21 of the negative current collector 19 are connected to a protruding portion of the negative electrodes 27 of the electrode assemblies 7 from the separators 28 by ultrasonic welding. For this reason, fine copper particles 34 may be separated from the negative electrode 27 made from copper foil. The separated copper particles 34 flows in an excessive electrolytic solution in the battery 1 (electrolytic solution that can flow without being held in the electrode assemblies 7) and reaches the positive electrode side. In particular, the copper particles 34, as shown in FIGS. 9A to 9C, may probably move when the battery 1 is rotated such that the negative electrode side faces the upper side (positive electrode side faces the lower side).

When the copper particles 34 adhere to the positive electrode made of aluminum; the adhering copper is eluted in the electrolytic solution under the influence of a positive electrode potential. In case of that the eluted copper ions reach the negative electrode, copper is deposited on the surface of the negative electrode. When an amount of deposition increases, the copper may burst through the separator 28 to reach the positive electrode side, resulting in formation of a micro-short circuit. As a result, the current flows through the micro-short circuit to locally generate heat, thereby causing the separator to be melted to form a small through hole. This increases amount of reduce of battery capacity, and the battery cannot exert desired performance. Even though small particles (aluminum particles) generated on the positive electrode side move onto the negative electrode side, since the aluminum particles are coated with oxide films, the aluminum particles adhering on the negative electrode are not eluted, and therefore the capacity of the battery is not reduced.

As flowing routes of the electrolytic solution that carries the copper particles 34 to the positive electrode side, six routes shown in FIG. 6, i.e., routes A, A, B, C, D, and E are given. The route A is the gap 51 in the present embodiment. The route N is a gap defined by the portions of the electrode assemblies 7 facing the bottom 2a of the battery case 2, the bottom 2a of the battery case 2, and the side wall of the battery case 2. The routes B and C are gaps formed at the centers of the electrode assemblies 7. The route D is a gap defined by portions of the two adjacent electrode assemblies 7 facing the lid 3 (upper end side of the electrode assemblies 7 in FIG. 6) and an inner side surface of the lid 3.

Figure 9:
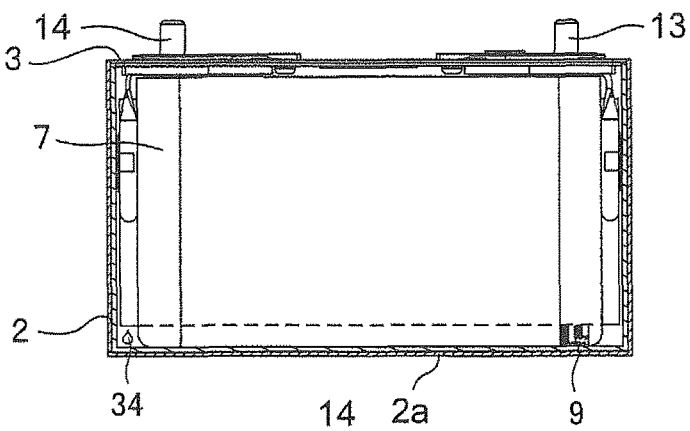
FIGS. 9 (a), (b), (c) show schematic diagrams showing an electrolytic solution and a copper particle when the non-aqueous electrolyte secondary battery is horizontally attached.
Figure 9:
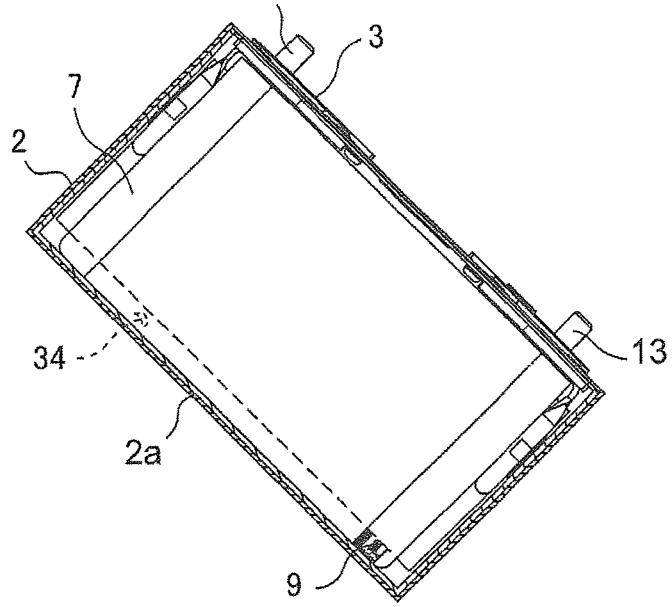
Figure 9:
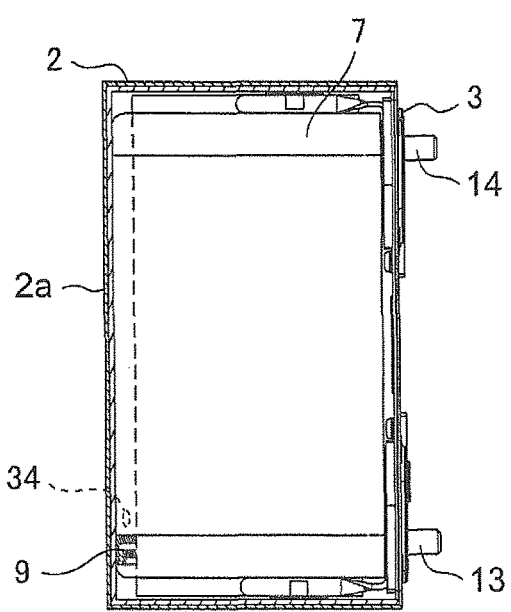

As shown in FIGS. 9 (a) to 9 (c), in the present embodiment, the gap 51 on the positive electrode side is closed with the closure piece 9 to form the cylindrical space 52, so that the copper particles 34 can be prevented from moving with respect to the following points.

First, even though the copper particles 34 generated in welding on the negative electrode side move from the opening of the gap 51 on the negative electrode side to the positive electrode side, the copper particles 34 are prevented by the closure piece 9 from moving. More specifically, in movement of the copper particles 34 from the negative electrode side through the gap 51 (route A), movement up to the closure piece 9 is allowed, but movement toward the positive electrode side over the closure piece 9 is prevented.

Secondly, in particular, as shown in FIGS. 9A and 9C, when the battery 1 is arranged while lying on its side such that the positive external terminal 13 faces the lower side and the negative external terminal 14 faces the upper side, the copper particles 34 entering the gap 51 sink in the electrolytic solution to reach the closure piece 9 (when the battery 1 has this posture, the closure piece 9 can be regarded as the bottom of the cylindrical space 52). The copper particles 34 reaching the closure piece 9 (bottom of the cylindrical space 52) do exit from the opening of the closure piece 9 on the negative electrode side (upper end of the cylindrical space 52 when the battery 1 has the posture). In other words, the copper particles 34 are held in the gap 51 (cylindrical space 52). The copper particles 34 once held in the gap (cylindrical space 52) do not move to the positive electrode side through the other routes A to E described with reference to FIG. 6.

As described above, in the battery 1 in the present embodiment, when the gap 51 in the battery case 2 is closed with the closure piece 9 on the positive electrode side, the copper particles 34 in the battery case 2 can be effectively prevented from moving without deteriorating the injection property of the electrolytic solution. Since the closure piece 9 is arranged in the gap 51 defined between the electrode assemblies 7 and the bottom 2a of the battery case 2, employing the closure piece 9 does not require reducing in size of the electrode assemblies 7, therefore not causing decreasing of an electric capacity of the battery.

(Second Embodiment)

Figure 10:
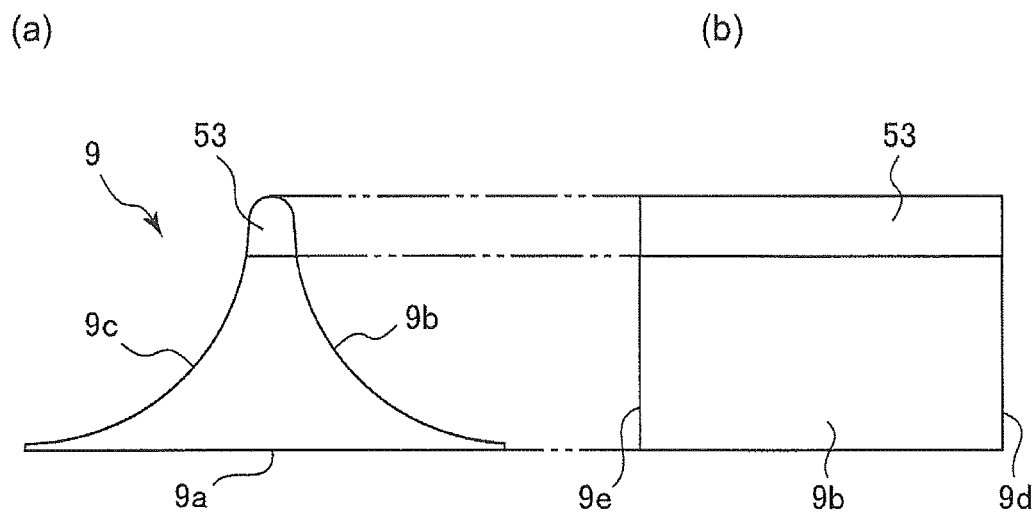
FIG. 10 shows a closure piece included in a non-aqueous electrolyte secondary battery according to the second embodiment of the present invention wherein (a) is a front view and (b) a side.
Figure 11:
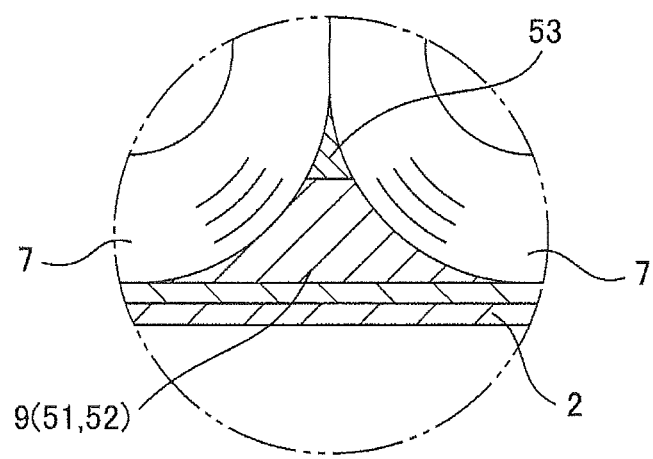
FIG. 11 is a partially enlarged view of the non-aqueous electrolyte secondary battery according to the second embodiment.

FIG. 10 shows the closure piece 9 included in the battery 1 according to a second embodiment of the present invention. The structure of the battery 1 according to the present embodiment is the same as that of the first embodiment except for the closure piece 9. The closure piece 9 according to the embodiment includes an adhesive agent layer 53 at the front-edge side of the side wall portions 9b and 9c. As conceptually shown in FIG. 11, the adhesive agent layer 53 is in tight contact with the outside surfaces of portions of the two electrode assemblies 7 arranged adjacent to each other facing the bottom 2a of the battery case 2. For this reason, by arranging the adhesive agent layer 53, the gap 51 can be reliably closed with the closure piece 9. Once the closure piece 9 is pressed into a predetermined position between the two adjacent electrode assemblies 7 at the time of production of the battery 1, the position of the closure piece 9 for the electrode assemblies 7 is kept by the adhesive agent layer 53. Therefore, arranging the adhesive agent layer 53 improves productivity of the battery 1.

Figure 12:
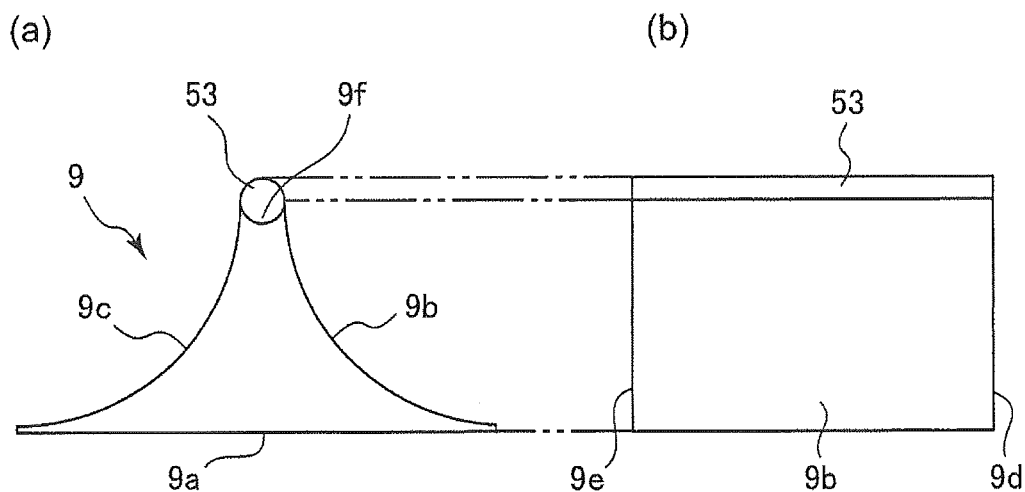
FIG. 12 shows a closure piece according to a modification of the second embodiment wherein (a) is a front view and (b) is a side view.

As in a modification shown in FIG. 12, recessed grooves 9f may be formed at tip ends of the side wall portions 9b and 9c of the closure piece 9, and the adhesive agent layer 53 may be arranged in the grooves 9f. With this configuration, the adhesive agent layer 53 is more stably held to the closure piece 9.

(Third Embodiment)

Figure 13:
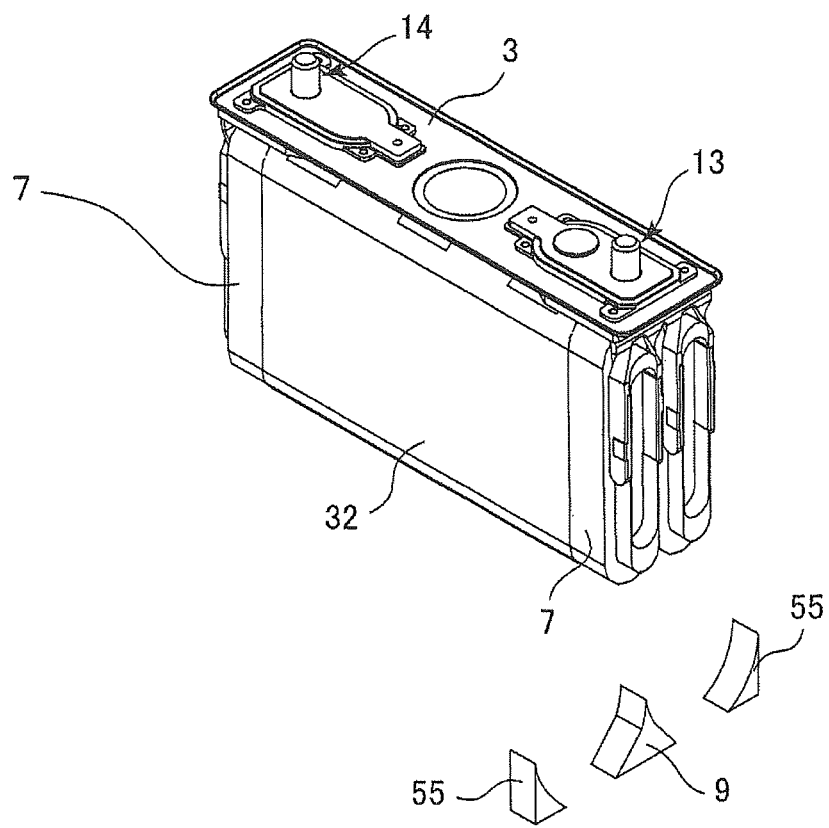
FIG. 13 is an exploded perspective view showing a non-aqueous electrolyte secondary battery according to a third embodiment of the present invention.

The battery 1 according to the third embodiment of the present invention shown in FIG. 13 includes, in addition to the same closure piece 9 as that in the first embodiment, a closure piece 55 to close a gap 54 (the route A described with reference to FIG. 6) defined by the portions of the electrode assemblies 7 arranged adjacent to each other facing the bottom 2a of the battery case 2, the bottom 2a of the battery case 2, and the side wall of the battery case 2. Since the gap 54 is closed, in addition to the route A (gap 51), an effect of preventing copper particles from moving to the positive-electrode side is further improved.

(Fourth Embodiment)

Figure 14:
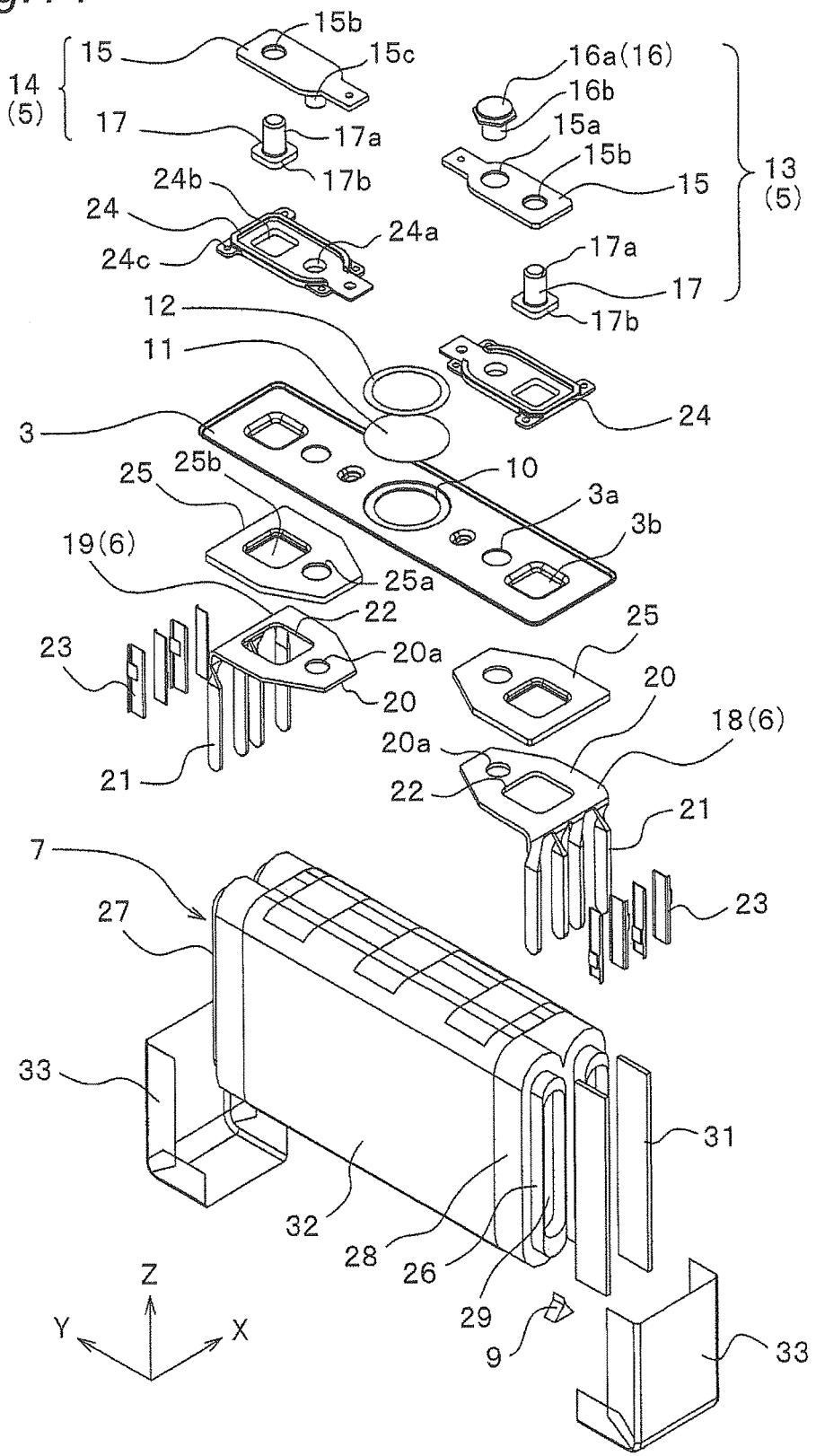
FIG. 14 is an exploded perspective view showing a non-aqueous electrolyte secondary battery according to a fourth embodiment of the present invention.
Figure 15:
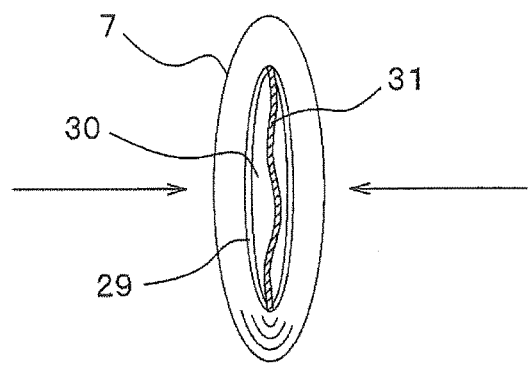
FIG. 15 shows an electrode wherein (a) is a side view of the electrode in the process of production (state in which a sheet-like member is inserted), (b) is a front view of a state in which the electrode assembly is flatten out in a direction of thickness, and (c) is a side view of (b)
Figure 15:
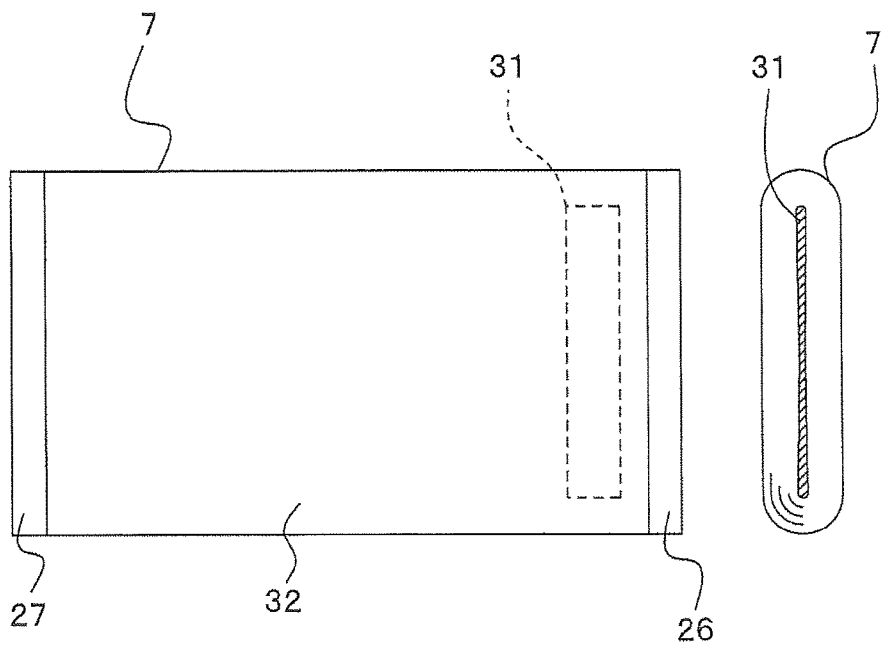

The battery 1 according to a fourth embodiment of the present invention shown in FIGS. 14 and 15 includes, in addition to the same closure piece 9 as that in the first embodiment, a sheet-like member 31 that closes central holes 30 formed in the electrode assemblies 7. Since the central holes 30 (the routes B and C described with reference to FIG. 6) are closed with the sheet-like member 31, an effect of preventing copper particles from moving to the positive-electrode side is further improved.

As shown in FIG. 15, the sheet-like member 31 is inserted into the central holes 30 of the electrode assemblies 7, i.e., vertically long holes formed (in a Z direction) by flat winding the electrodes. The sheet-like member 31 is made of foamed polyethylene or the like and has flexibility. Thus, when the sheet-like member 31 is inserted into the central hole 30 of the electrode assembly 7, the sheet-like member 31 can be deformed to have a wave shape, and the both ends of the sheet-like member 31 can be brought into contact with the both ends of the central hole 30 of the electrode assembly 7. By flatting out the electrode assembly 7 in a direction of thickness (X direction), the sheet-like member 31 evenly smoothly extends in accordance with a change in shape of the central hole 30 deformed in the form of a slit. The sheet-like member 31 closes the deformed central hole 30 along a portion of the positive electrode 26 protruding from the separator 28. Thus, the length of the sheet-like member 31 is equal to the length of the deformed central hole 30.

In case that the sheet-like member 31 is made of foamed polyethylene or the like, a member including closed pores (structure having independent pores) may also be used. However, in view of the permeability of the electrolytic solution, a member having continuous pores (structure in which continuous gaps are formed) is preferably used. This is because that due to the sizes of the gaps the member with closed pores prevents not only small particles described later but also the electrolytic solution from flowing. On the other hand, the member with continuous pores prevents the small particles but allows the electrolytic solution to move.

In production of the battery 1 according to the present embodiment, the sheet-like member 31 is inserted from the positive-electrode side into the central hole 30 of the flatted cylindrical body. The sheet-like member 31 is inserted while being bent in the form of a wave, and the both ends of the sheet-like member 31 are brought into contact with the both end sides of the elongated central hole 30. Subsequently, the cylindrical body is flattened out from the both sides. In this manner, the central hole 30 has a vertically long slit-like shape, and the sheet-like member 31 has a flat shape in accordance with the change in shape of the central hole 30. As a result, the slit-like central hole 30 is completely closed with the sheet-like member 31 at a position along the positive electrode 26 protruding from a one-end side of the cylindrical body.

As described above, in case that the sheet-like member 31 is formed in the form of a wave in advance, the sheet-like member 31 can be smoothly inserted into the central hole 30 because the rigidity of the sheet-like member 31 is improved. In this case, the wave form of the sheet-like member 31 has convex projections such that the number of convex projections on the right of a center line is equal to the number of convex projections on the left thereof, so that the sheet-like member 31 can be positioned in a balanced manner when inserted into the central hole 30.

(Fifth Embodiment)

Figure 16:
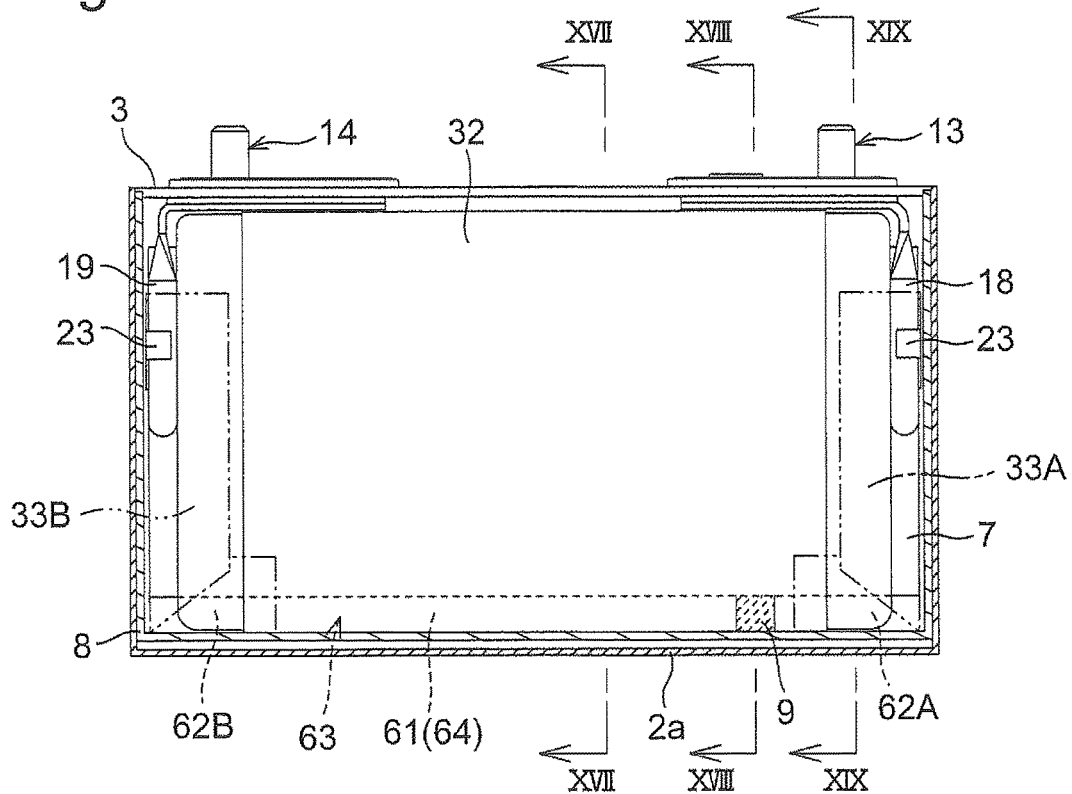
FIG. 16 is a sectional view of a non-aqueous electrolyte secondary battery according to a fifth embodiment of the present invention.
Figure 17:
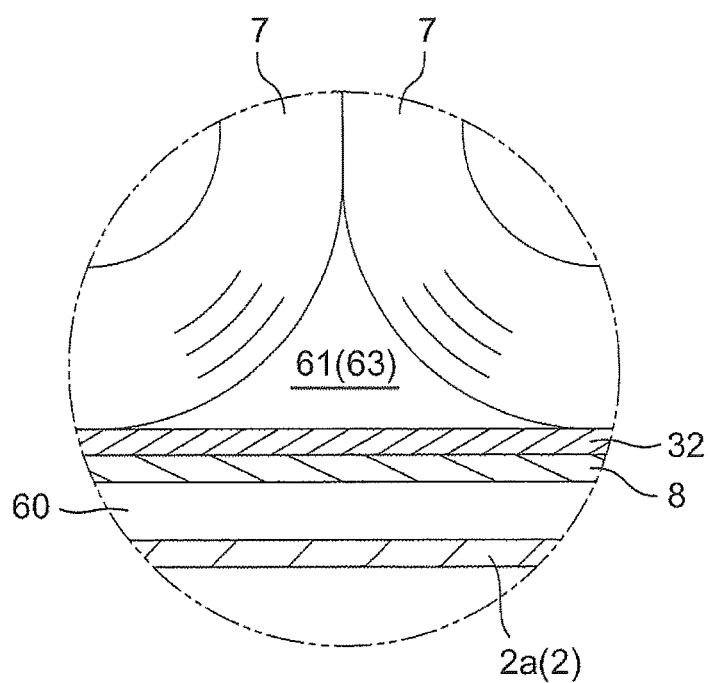
FIG. 17 is a partially enlarged sectional view taken along a line XVII-XVII in FIG. 16.
Figure 18:
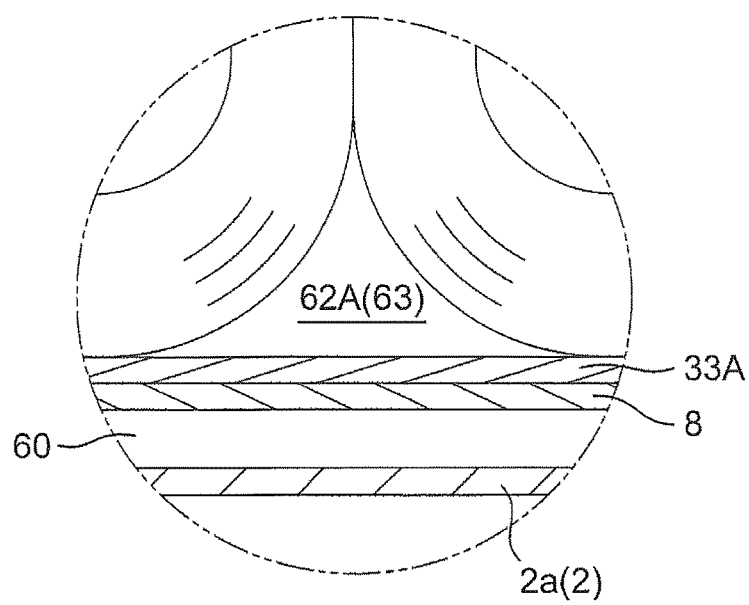
FIG. 18 is a partially enlarged sectional view taken along a line XVIII-XVIII in FIG. 16.

FIG. 16 shows the battery 1 according to a fifth embodiment of the present invention. The insulation sheet 8 is tightly contacted with the bottom portions of the electrode assemblies 7. A gap 60 is formed between the electrode assemblies 7 and the bottom 2a of the battery case 2. Also referring to FIG. 17, the two electrode assemblies 7 and the bundling sheet 32 that wraps and bundles the two electrode assemblies 7 define a narrowly elongated gap 61 having opening at the both ends and extending in opposing direction of the positive current collector 18 and the negative current collector 19 (left and right directions in the battery case 2 in FIG. 16). Specifically, the gap 61 is defined by the portions of the two electrode assemblies 7 facing the bottom 2a of the battery case 2 and the bundling sheet 32. Also referring to FIG. 18, at the both ends of the two electrode assemblies 7, the electrode assemblies 7 and the protection sheets 33A and 33B that cover the lower ends of the electrode assemblies 7 on the both end sides together with the collectors 18 and 19 respectively define short gaps 62A and 62B each having openings at the both ends. Specifically, the gaps 62A and 62B are defined by the portions of the two electrode assemblies 7 facing the bottom 2a of the battery case 2 and the protection sheets 33A and 33B. The gaps 62A and 62B are arranged almost linearly along the gap 61 and fluidly communicate with the gap 61. In other words, the gaps 61, 62A, and 62B communicating with each other configure a single narrowly elongated gap 63 having openings at the both ends like the gap 51 according to the first embodiment.

Figure 19:
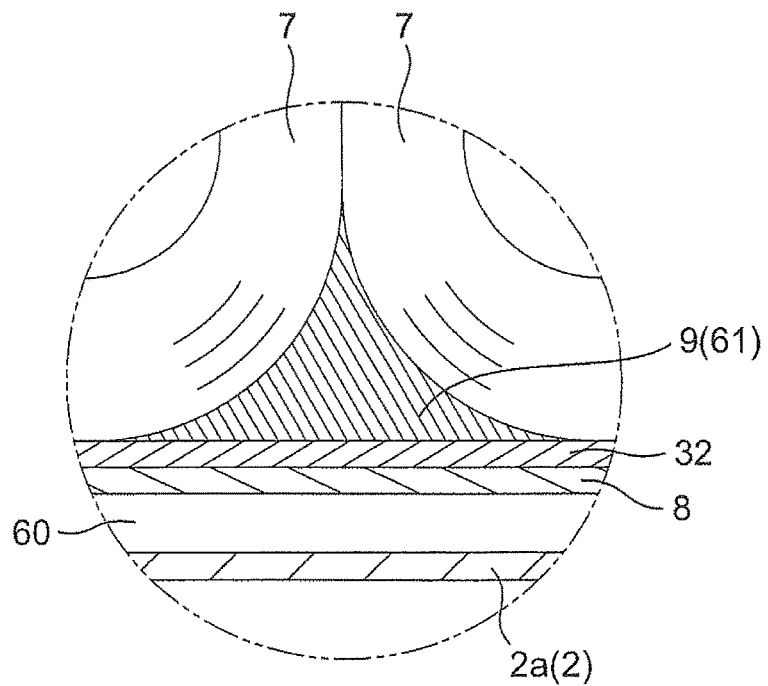
FIG. 19 is a partially enlarged sectional view taken along a line XIX-XIX in FIG. 16.

Also referring to FIG. 19, the closure piece 9 that partially closes the gap 63 is arranged on the positive current collector 18 side of the gap 63 (the right side with respect to the center of the gap 63 in FIG. 6). Specifically, the closure piece 9 is arranged at a position on the positive current collector 18 side of the gap 61 defined by the electrode assemblies 7 and the bundling sheet 32. By arranging the closure piece 9 in the gap 61, the gap 61 does not have openings at the both ends and is a cylindrical space 64 having an opening at one end (negative current collector 19 side) and being closed at the other end (positive current collector 18 side). Specifically, the cylindrical space 64 is configured by the gap 62B on the negative current collector 19 side defined by the electrode assemblies 7 and the protection sheet 33B and an area on the negative current collector 19 side with reference to the closure piece 9 in the gap 61 defined by the electrode assemblies 7 and the bundling sheet 32.

The closure piece 9 has similar structure, shape, material as those in the first embodiment (for example, see FIG. 7). The closure piece 9 may have similar structure, shape, and material as those in the second embodiment (for example, see FIGS. 10 and 12).

Since the closure piece 9 is arranged on only the positive current collector 18 side of the gap 63, the smoothness of the flow of electrolytic solution during injection of the electrolytic solution into the battery case 2 is not considerably spoiled. On the other hand, when fine copper particles (for example, see reference numeral 34 in FIG. 9) generated during welding of the legs 21 of the negative current collector 19 and the negative electrodes 27 of the electrode assemblies 7 by ultrasonic welding flow into the electrolytic solution and enter the gap 63, the fine copper particles can move to the closure piece 9, but cannot move to the positive electrode side over the closure piece 9. In other words, by closing the positive electrode side of the gap 63 with the closure piece 9 to form the cylindrical space 64, it is possible to effectively prevent the fine copper particles from moving to the positive electrode side. Since the closure piece 9 is arranged in the gap 63 defined by the electrode assemblies 7, the bundling sheet 32, and the protection sheets 33A and 33B, employing the closure piece 9 does not require reducing in size of the electrode assemblies 7, therefore not decreasing the electric capacity.

The other configurations and operations of the fifth embodiment are the same as those in the first embodiment.

(Sixth Embodiment)

Figure 20:
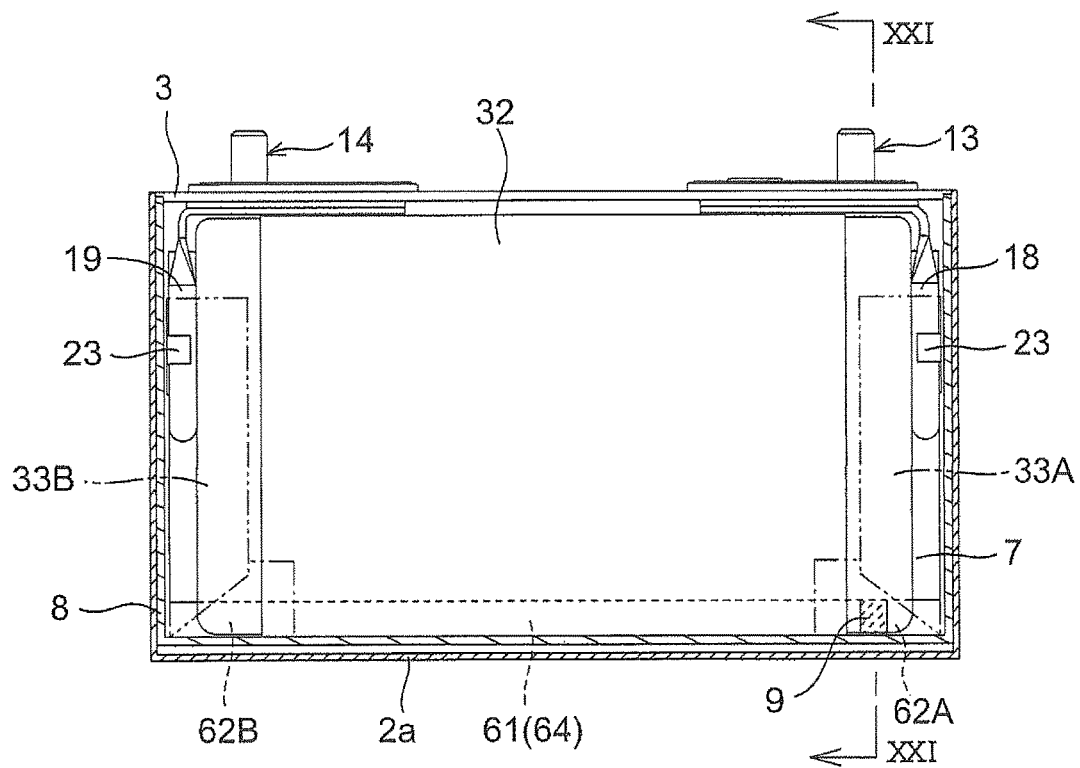
FIG. 20 is a sectional view of a non-aqueous electrolyte secondary battery according to a sixth embodiment of the present invention.
Figure 21:
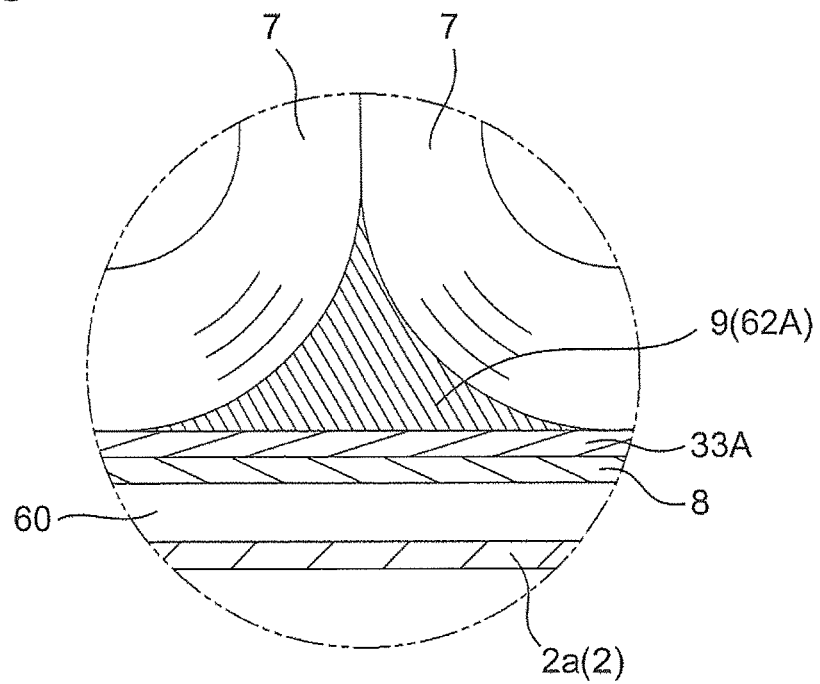
FIG. 21 is a partially enlarged sectional view taken along a line XX-XX in FIG. 20.
Figure 22:
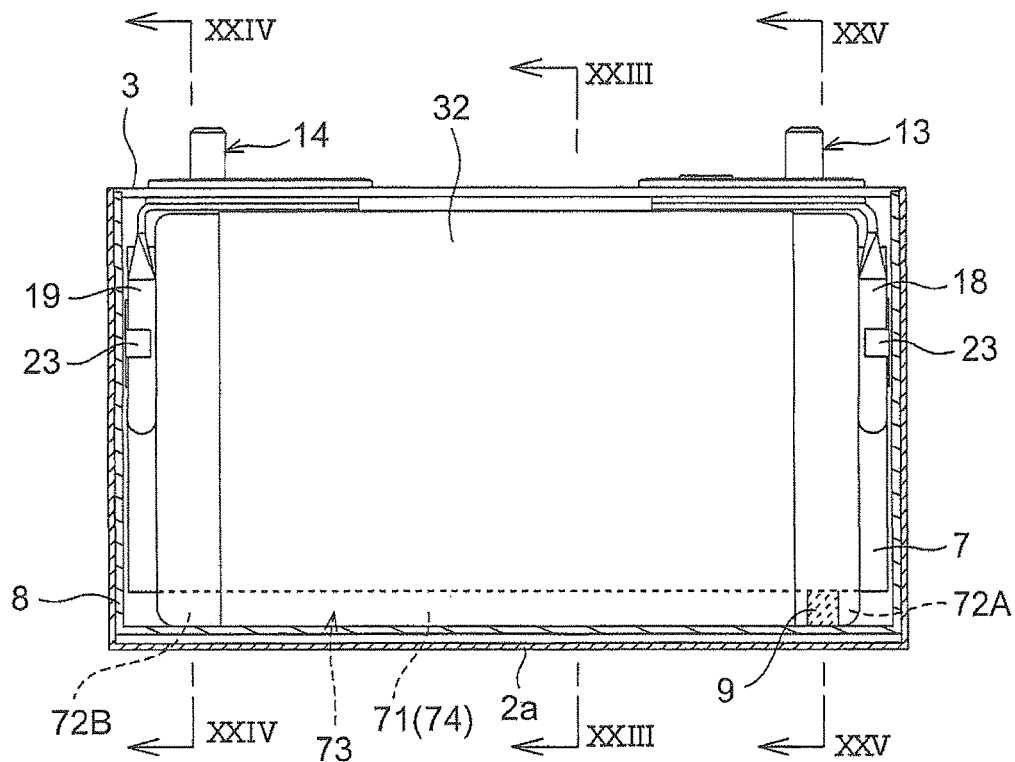
FIG. 22 is a sectional view of a non-aqueous electrolyte secondary battery according to a seventh embodiment of the present invention.

The battery 1 according to a sixth embodiment of the present invention shown in FIGS. 20 and 21 is different from the fifth embodiment in a position where the gap 63 is closed with the closure piece 9. The same reference numerals as in FIGS. 20 and 21 denote the same elements in the fifth embodiment (FIGS. 16 to 19).

The closure piece 9 in the fifth embodiment is arranged in the gap 61 of the gaps 61, 62A, and 62B configuring the gap 63. In contrast to this, in the present embodiment, the closure piece 9 is arranged in a gap 62A located on the positive electrode side with reference to the gap 61. Specifically, in the embodiment, the closure piece 9 is arranged in the gap 62A defined by the portions of the two electrode assemblies 7 facing the bottom 2a of the battery case 2 and the protection sheet 33A on the positive electrode side.

Since the closure piece 9 is arranged only on the positive current collector 18 side of the gap 63, the smoothness of the flow of electrolytic solution in the battery case 2 is not considerably spoiled. On the other hand, by closing the positive electrode side of the gap 63 with the closure piece 9 to form the cylindrical space 64, it is possible to effectively prevent the fine copper particles from moving to the positive electrode side. Further, employing the closure piece 9 does not require reducing in size of the electrode assemblies 7, therefore not decreasing the electric capacity.

The other configurations and operations of the sixth embodiment are the same as those in the first embodiment.

(Seventh Embodiment)

FIGS. 22 to 25 show the battery 1 according to a seventh embodiment of the present invention. The battery 1 according to the present invention is different from the fifth embodiment in not providing the protection sheets 33A and 33B. The same reference numerals as in FIGS. 22 to 25 denote the same elements in the fifth embodiment (FIGS. 16 to 19).

Figure 23:
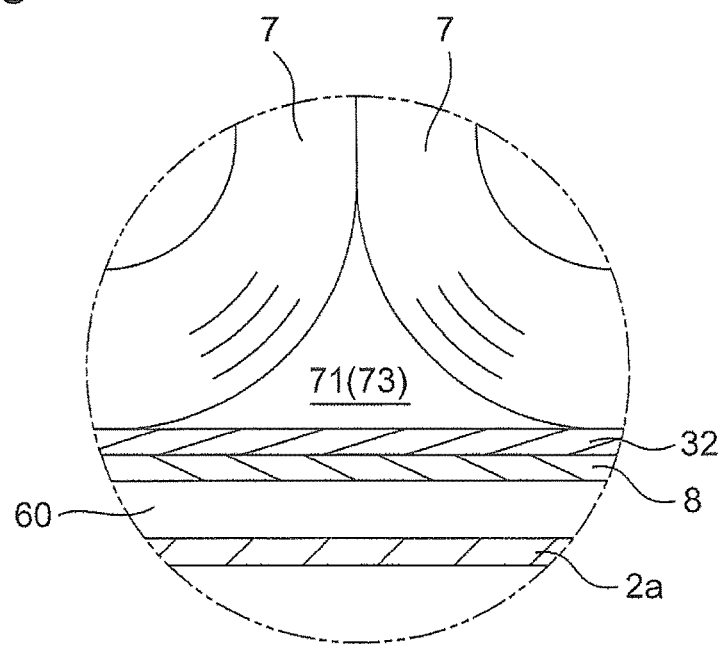
FIG. 23 is a partially enlarged sectional view taken along a line XXIII-XXII in FIG. 22.
Figure 24:
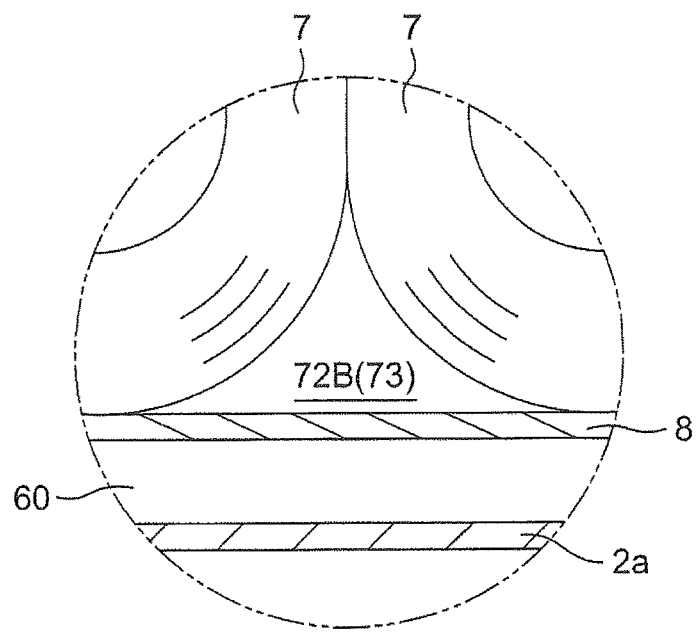
FIG. 24 is a partially enlarged sectional view taken along a line XXIV-XXIV in FIG. 22.

Referring to FIG. 23, the portions of the two electrode assemblies 7 facing the bottom 2a of the case 2 and the bundle sheet 32 define a gap 71 narrowly elongated in the opposing direction of the positive current collector 18 and the negative current collector 19. The outside of the bundle sheet 32 is covered with the insulation sheet 8. Further, as shown in FIG. 24, on the both ends of the electrode assemblies 7, the portions of the electrode assemblies 7 facing the bottom 2a of the battery case 2 and the insulation sheet 7 respectively define short gaps 72A and 72B each having openings at the both ends. Specifically, the gaps 72A and 72B are defined by the portions of the two electrode assemblies 7 facing the bottom 2a of the battery 2 and the insulation sheet 8. These gaps 72A and 72B are arranged almost linearly along the gap 61 and fluidly communicate with the gap 61. In other words, the gaps 71, 72A, and 72B communicating with each other configure a single narrowly elongated gap 73 having openings at the other ends.

Figure 25:
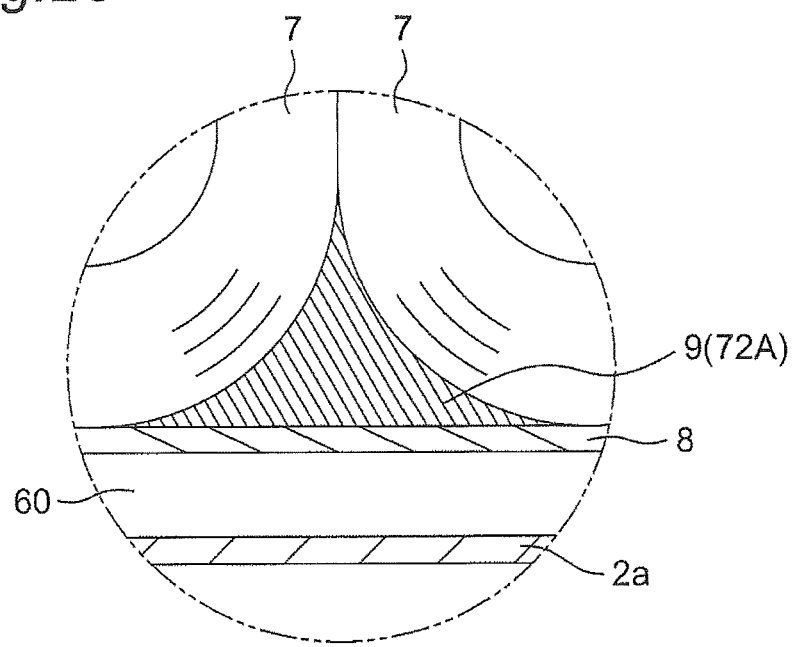
FIG. 25 is a partially enlarged sectional view taken along a line XXV-XXV in FIG. 22.

Also referring to FIG. 25, the closure piece 9 partially closing the gap 73 is arranged on the positive electric corrector 18 side of the gap 73. Specifically, the closure piece 9 is arranged in the gap 72A defined by the portions of the electrode assemblies 7 on the positive current collector 18 side and the insulation sheet 8. By arranging the closure piece 9 in the gap 72A, the gap 73 forms a cylindrical space 74 having an opening at one end (negative current collector 19 side) and being closed at the other end (positive current collector 18 side).

Since the closure piece 9 is arranged only on the positive current collector 18 side, smoothness of the flow of electrolytic solution is not considerably spoiled. On the other hand, by closing the positive electrode side of the gap 73 with the closure piece 9 to form the cylindrical space 74, the micro copper particles are effectively prevented from moving toward the positive electrode side. Further, applying the closure piece 9 does not require reducing in size of the electrode assemblies 7, therefore not causing decreasing of an electric capacity of the battery.

The other configuration and operations of the seventh embodiment are the same as those in the first embodiment.

The present invention is not limited to the configurations described in the above embodiments, and various modifications thereof can be effected.

In the above embodiment, although the protection sheets 33A and 33B are stuck to the both end faces of the electrode assemblies 7, only one end face of the electrode assemblies 7 may be covered with any one of the protection sheets 33A and 33B. In this case, any one of the protection sheet 33A on the positive electrode side and the protection sheet 33B on the negative electrode side may be arranged. Arranging the protection sheet 33A on the positive electrode side is preferable in view that the copper particles 34 from directly flowing into the electrode assemblies 7 can be prevented.

The protection sheets 33A and 33B need only cover at least the lower ends of the electrode assemblies 7 and the size of the protection sheets 33A and 33B is to be limited so that the electrolytic solution can enter into the central holes 30 of the electrode assemblies 7 when the electrolytic solution is injected. The upper edges of the protection sheets 33A and 33B are preferably configured to be located above the level of the electrolytic solution filled between the electrode assemblies 7 and the battery case 2.

In the above embodiments, the electric storage element having the configuration in which the electrode assemblies 7 are arranged in two lines in a width direction. However, in case the electrode assemblies 7 is arranged in one line or three or more lines, a configuration having the same protection sheets as the protection sheets 33A and 33B according to the present invention can be employed.

Further, although a non-aqueous electrolyte secondary battery is described as an example of the electric storage element in the above embodiments, the present invention can be applied to various batteries such as a lead battery and capacitors or the like.

Furthermore, although the insulation sheet 8 and the closure piece 9 are different members in the above embodiments; these members may be integrated with each other.

What is claimed is:

1. An electric storage element comprising:
   a casing;
   a positive external terminal and a negative external terminal respectively comprising exposed portions exposed from the casing to the outside;
   a positive current collector and a negative current collector arranged inside the casing and respectively connected to the positive external terminal and the negative external terminal;
   a plurality of electrode assemblies arranged inside the casing so as to be arranged adjacent to each other, each of the electrode assemblies having a positive electrode, a negative electrode, and a separator each of which has a strip-like shape, the positive and negative electrodes being wound with the separator being interposed therebetween so as to have positions shifted to opposite sides in a width direction with reference to the separator, the positive electrode being connected to the positive current collector at a first end of the plurality of electrode assemblies, and the negative electrode being connected to the negative current collector at a second end of the plurality of electrode assemblies;
   a gap formed at one of the first and second ends of the plurality of electrode assemblies, and defined between the two electrode assemblies arranged adjacent to each other and a bottom of the casing so as to extend between a positive current collector side and a negative current collector side and to allow fluid communication between the positive current collector side and the negative current collector side; and
   a closure member placed at the other of the first and second ends of the plurality of electrode assemblies, and forming a closed end of the gap.

2. The electric storage element according to claim 1, wherein the closure member is arranged on the positive current collector side in the gap.

3. The electric storage element according to claim 2, wherein the gap has an opening on the negative current collector side and is closed with the closure member on the positive current collector side so as to define a cylindrical space.

4. The electric storage element according to claim 1, wherein the closure member comprises:
   a bottom arranged on the bottom side in the casing;
   a pair of side wall portions being contact with outside surfaces of portions of the two electrode assemblies arranged adjacent to each other facing the bottom of the casing; and
   a pair of ends at the both ends of the bottom and the side wall portions.

5. The electric storage element according to claim 4, wherein the outside surface of the electrode assemblies facing the bottom of the casing is a convexly curved surface and the side wall portion of the closure member has a shape along the curved surface.

6. The electric storage element according to claim 1, wherein elastic deformation of the closure member brings the side wall portions of the closure member into press contact with the outside surfaces of the electrode assemblies.

7. The electric storage element according to claim 4, wherein the closure member further comprises an adhesive agent layer provided at a front edges of the pair of side wall portions and being in tight contact with the outer surface of the two electrode assemblies arranged adjacent to each other facing the bottom of the casing.

8. The electric storage element according to claim 1, wherein the gap is defined by the portions of the electrode assemblies arranged adjacent to each other facing the bottom of the casing and the bottom of the casing.

9. The electric storage element according to claim 8, wherein the positive electrode includes a positive metal foil and a positive-electrode active material layer formed on the positive metal foil,
   wherein the negative electrode includes a negative metal foil and a negative-electrode active material layer formed on the negative metal foil,
   wherein the end of the closure member on the positive current collector side is located on the negative current collector side with reference to an end of the negative-electrode active material layer on the positive current collector side.

10. The electric storage element according to claim 9, wherein the end of the closure member on the positive current collector side is located on the negative current collector side with reference to the end of the positive-electrode active material layer on the positive current collector side.

11. The electric storage element according to claim 9, wherein the positive metal foil is made of an aluminum-based material and the negative metal foil is made of a copper-based material.

12. The electric storage element according to claim 1, further comprising a bundling sheet that bundles the plurality of electrode assemblies arranged adjacent to each other,
   wherein the gap is defined by the portions of the electrode assemblies arranged adjacent to each other facing the bottom of the casing and the bundling sheet.

13. The electric storage element according to claim 1, further comprising a protection sheet that covers a portion including at least lower ends of end faces of the electrode assemblies on the positive electrode side,
   wherein a part of the gap is defined by the portions of the electrode assemblies arranged adjacent to each other facing the bottom of the casing and the protection sheet.

14. The electric storage element according to claim 1, further comprising an insulation sheet that covers the electrode assemblies arranged adjacent to each other, wherein the gap is defined by the portions of the electrode assemblies arranged adjacent to each other facing the bottom of the casing and the insulation sheet.

15. The electric storage element according to claim 1, wherein the closure member comprises a planar end portion extending in a direction from the bottom of the casing to the two electrode assemblies and forming the closed end of the gap.

16. The electric storage element according to claim 15, wherein the gap comprises a cylindrical space including an open end on the negative current collector side and the closed end formed on the positive current collector side by the planar end portion of the closure member.

17. The electric storage element according to claim 1, wherein the casing comprises a plurality of side walls, the bottom of the casing connecting the plurality of side walls,
wherein the electric storage element further comprises an insulation sheet formed on an inner surface of the plurality of side walls and the bottom of the casing, and
wherein the closure member is formed between the insulation sheet and the two electrode assemblies.

18. The electric storage element according to claim 1, wherein the two electrode assemblies comprise positive and negative electrode active material layers, and an end of the closure member on the positive current collector side of the closure member is positioned away from an end of the positive and negative electrode active material layers.

19. The electric storage element according to claim 1, wherein the two electrode assemblies are bundled together by a bundling sheet, and an end of the closure member on a negative current collector side of the closure member is positioned on a positive current collector side of the bundling sheet.

20. An electric storage element comprising:
a casing;
a plurality of electrode assemblies arranged adjacent to each other inside the casing, each of the electrode assemblies having a positive electrode and a negative electrode;
a positive current collector connected to the positive electrode at a first end of the plurality of electrode assemblies;
a negative current collector connected to the negative electrode at a second end of the plurality of electrode assemblies;
a gap formed at one of the first and second ends of the plurality of electrode assemblies, and defined between the plurality of electrode assemblies and a bottom of the casing so as to extend between a positive current collector side and a negative current collector side; and
a closure member placed at the other of the first and second ends of the plurality of electrode assemblies, and between the plurality of electrode assemblies and the bottom of the casing, and forming a closed end of the gap.

\* \* \* \* \*